(12) United States Patent
Oka

(10) Patent No.: US 8,529,069 B2
(45) Date of Patent: Sep. 10, 2013

(54) PROJECTION APPARATUS AND CONTROL METHOD THEREOF

(75) Inventor: Nobuhiro Oka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 13/091,699

(22) Filed: Apr. 21, 2011

(65) Prior Publication Data

US 2011/0285971 A1 Nov. 24, 2011

(30) Foreign Application Priority Data

May 18, 2010 (JP) ................................ 2010-114705

(51) Int. Cl.
*G03B 21/14* (2006.01)

(52) U.S. Cl.
USPC ................... 353/69; 353/30; 353/70; 353/94; 348/745; 348/746; 349/7

(58) Field of Classification Search
USPC ................ 353/30, 69, 70, 94; 348/745, 746, 348/747, 806, 580, 581, 583, 744; 349/5, 349/7, 8, 9, 10
See application file for complete search history.

(56) References Cited

U.S. PATENT DOCUMENTS

| 5,664,858 A * | 9/1997 | Woo ................................ 353/69 |
| 6,367,933 B1 * | 4/2002 | Chen et al. ...................... 353/69 |
| 7,600,876 B2 * | 10/2009 | Kurosu et al. .................... 353/69 |
| 2008/0100806 A1 * | 5/2008 | Inazumi ............................ 353/31 |
| 2009/0207384 A1 * | 8/2009 | Honjo et al. ..................... 353/69 |

FOREIGN PATENT DOCUMENTS

| CN | 1169228 A | 12/1997 |
| CN | 1324542 A | 11/2001 |
| JP | 2007-251723 | 9/2007 |
| JP | 2009-284135 A | 12/2009 |

OTHER PUBLICATIONS

The references were cited in a Apr. 9, 2013 Chinese Office Action, which is enclosed with an English Translation, that issued in Chinese Patent Application No. 201110129564.1.

* cited by examiner

*Primary Examiner* — Georgia Y Epps
*Assistant Examiner* — Sultan Chowdhury
(74) *Attorney, Agent, or Firm* — Cowan, Liebowitz & Latman, P.C.

(57) ABSTRACT

A projection apparatus which projects an image onto a projection plane based on an input image signal, the apparatus comprises: a division unit configured to divide an image represented by the input image signal into a plurality of regions; a deformation unit configured to deform various types of shapes of the images divided by the division unit; a combination unit configured to combine the images deformed by the deformation unit; and a projection unit configured to project the image combined by the combination unit onto the projection plane.

14 Claims, 20 Drawing Sheets

IMAGE ON LCD UNIT 104 WITHOUT TRAPEZOID DISTORTION CORRECTION

IMAGE ON SCREEN WITHOUT TRAPEZOID DISTORTION CORRECTION

IMAGE ON LCD UNIT 104 AFTER TRAPEZOID DISTORTION CORRECTION

IMAGE ON SCREEN AFTER TRAPEZOID DISTORTION CORRECTION

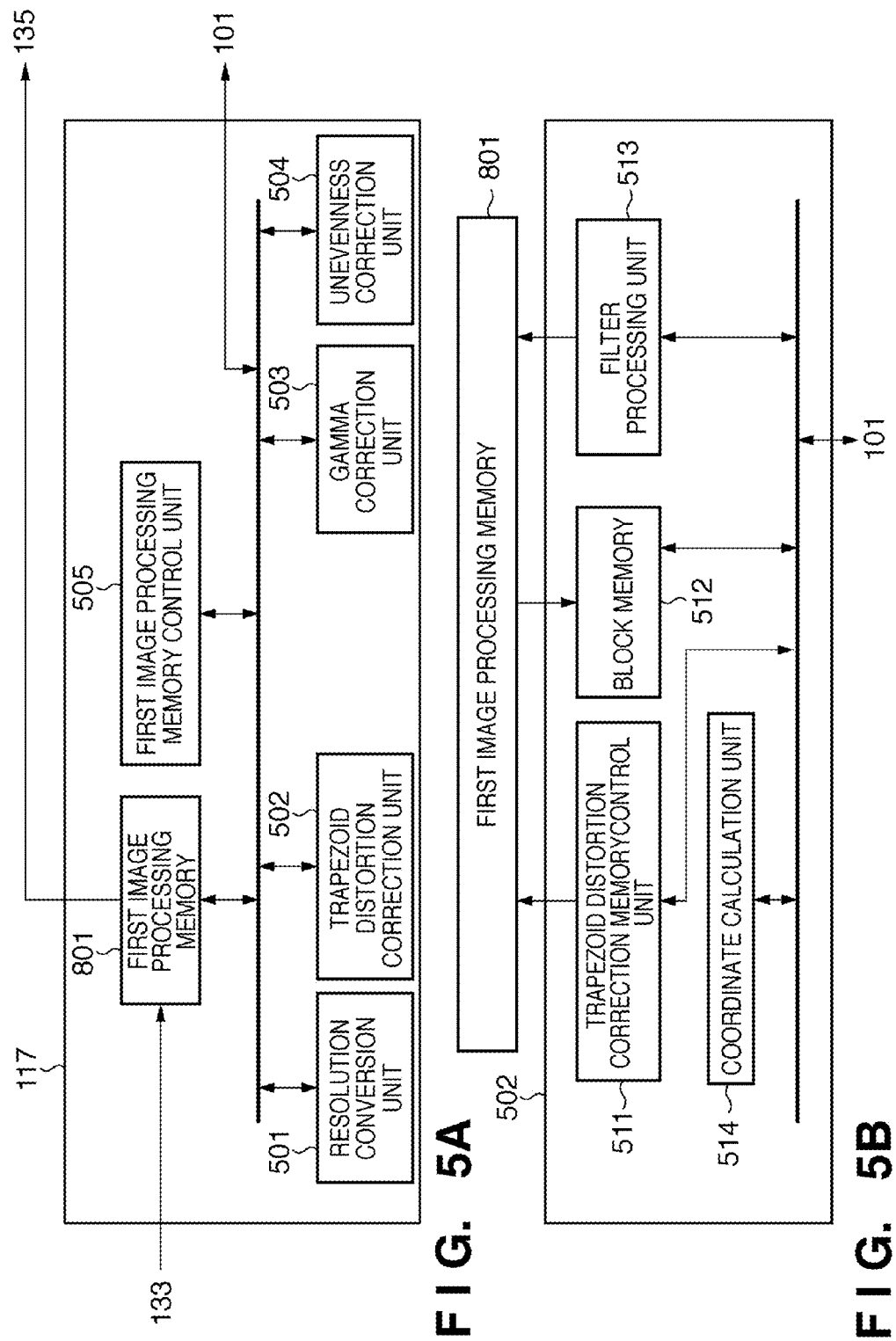

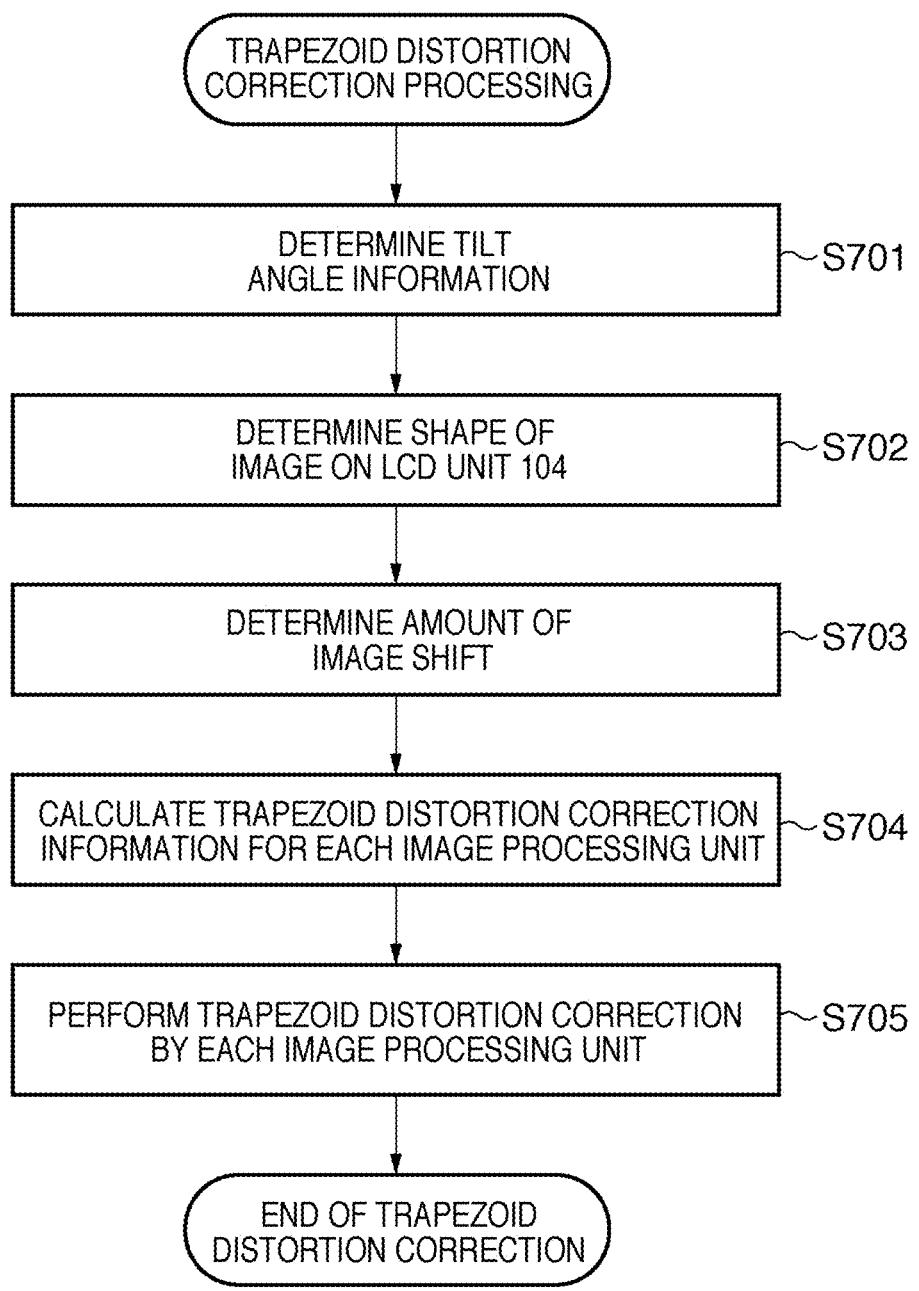

IMAGE ON LCD UNIT 104 WITHOUT TRAPEZOID DISTORTION CORRECTION

IMAGE ON SCREEN WITHOUT TRAPEZOID DISTORTION CORRECTION

IMAGE ON LCD UNIT 104 AFTER TRAPEZOID DISTORTION CORRECTION

IMAGE ON SCREEN AFTER TRAPEZOID DISTORTION CORRECTION

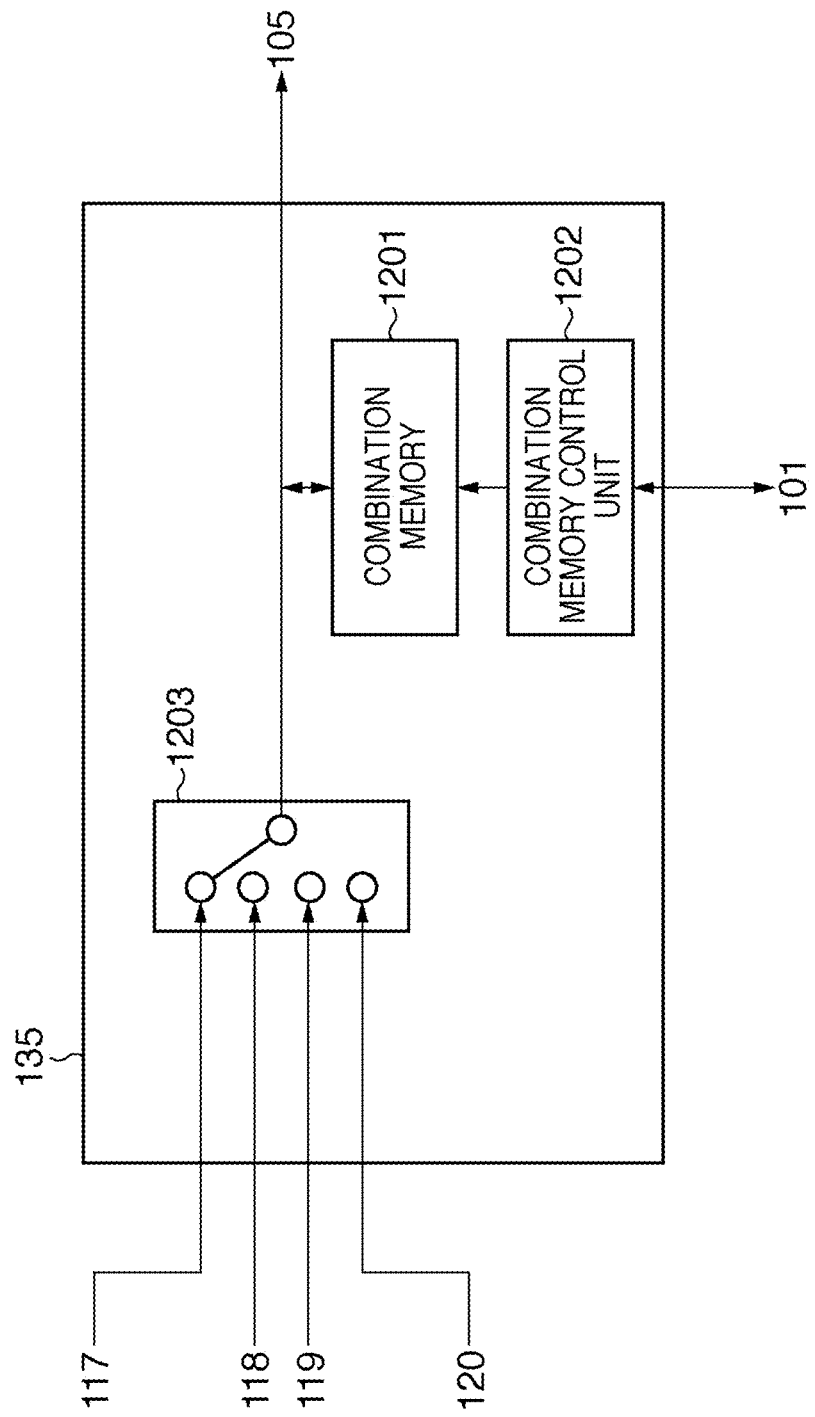

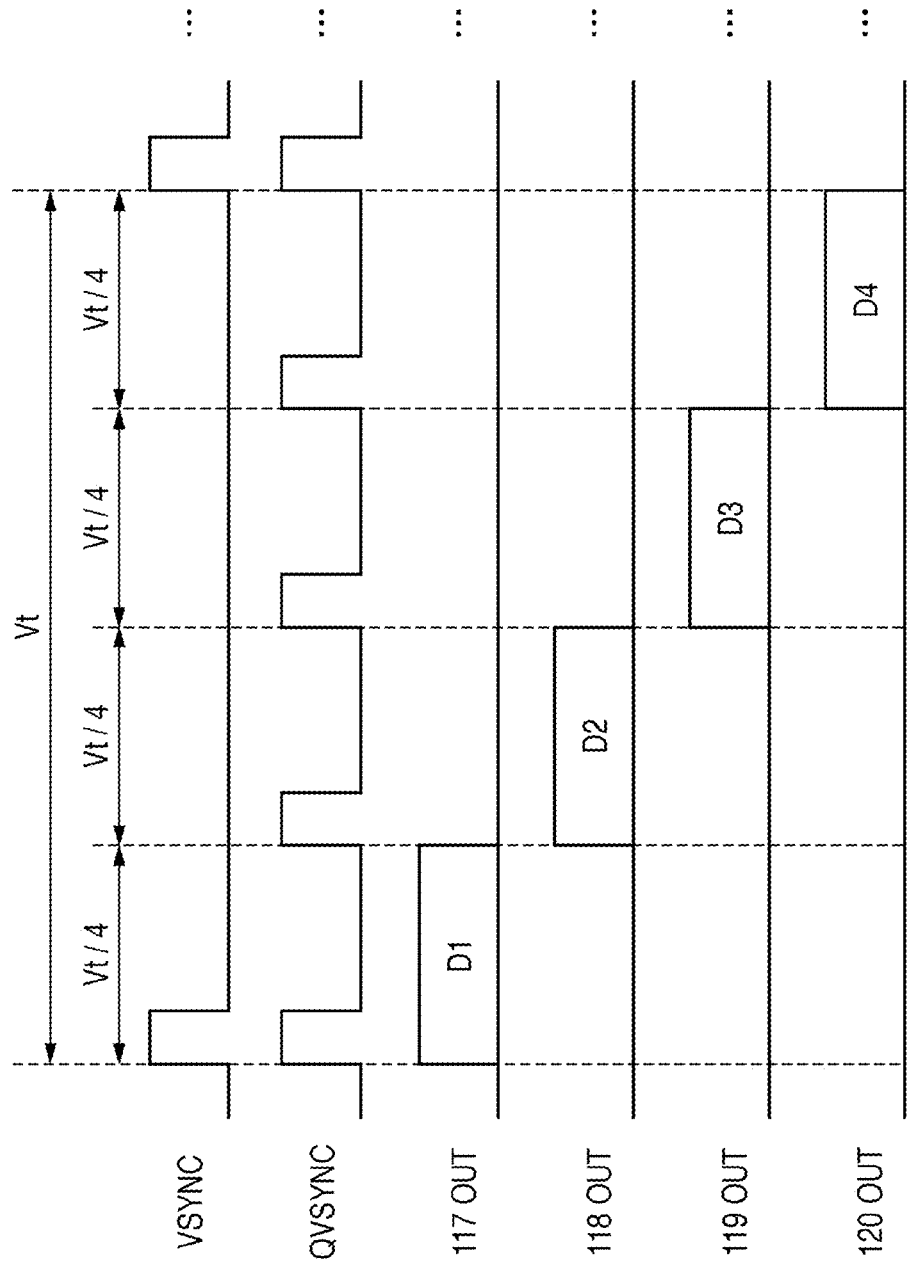

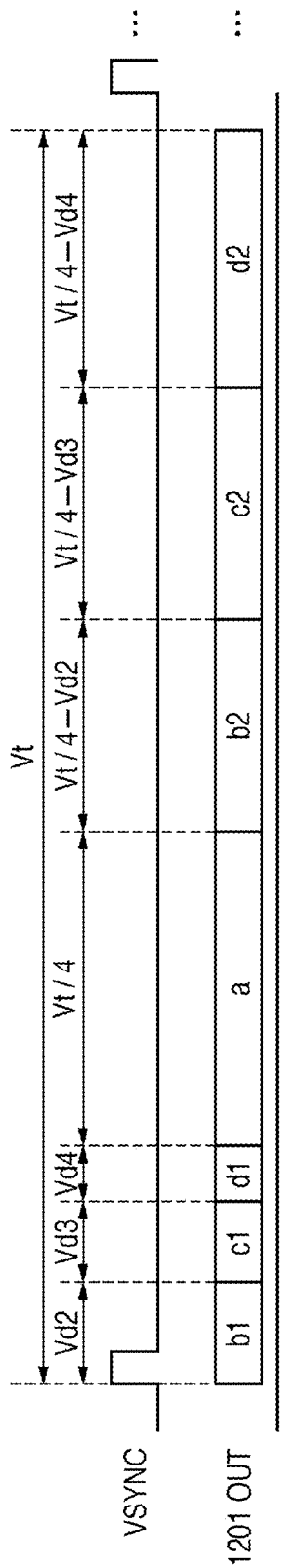
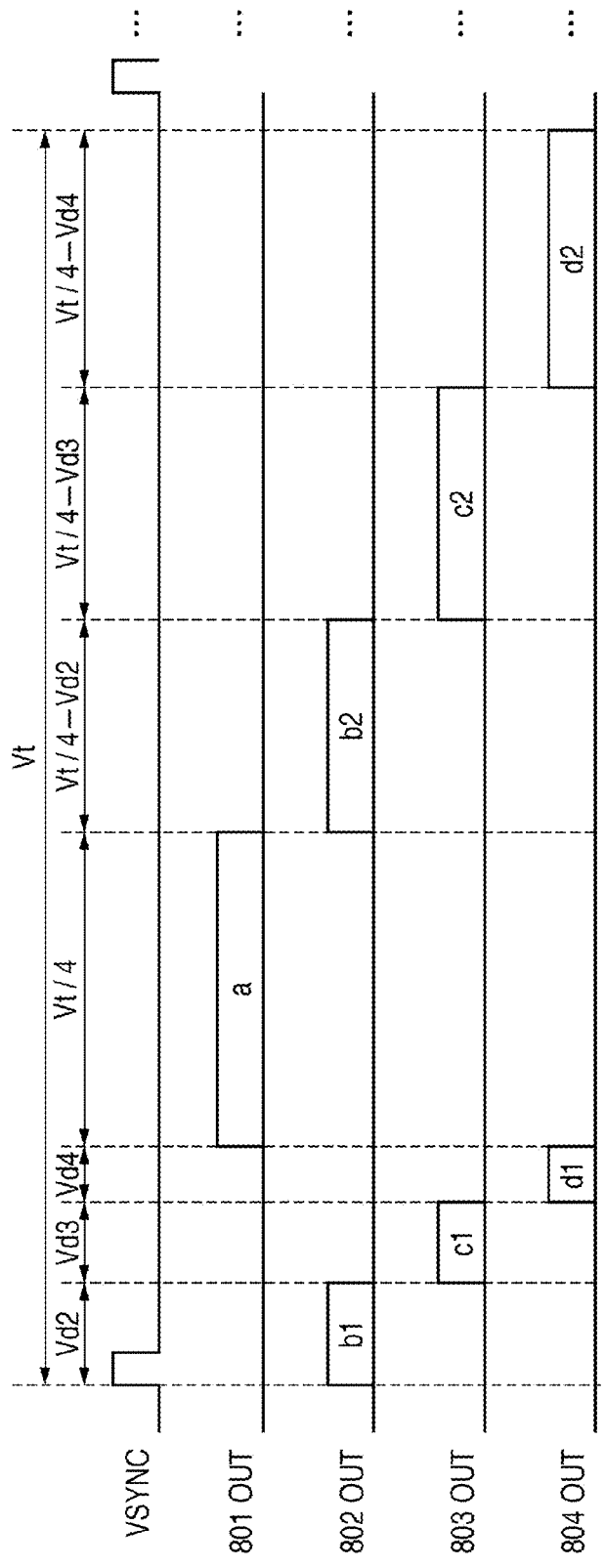

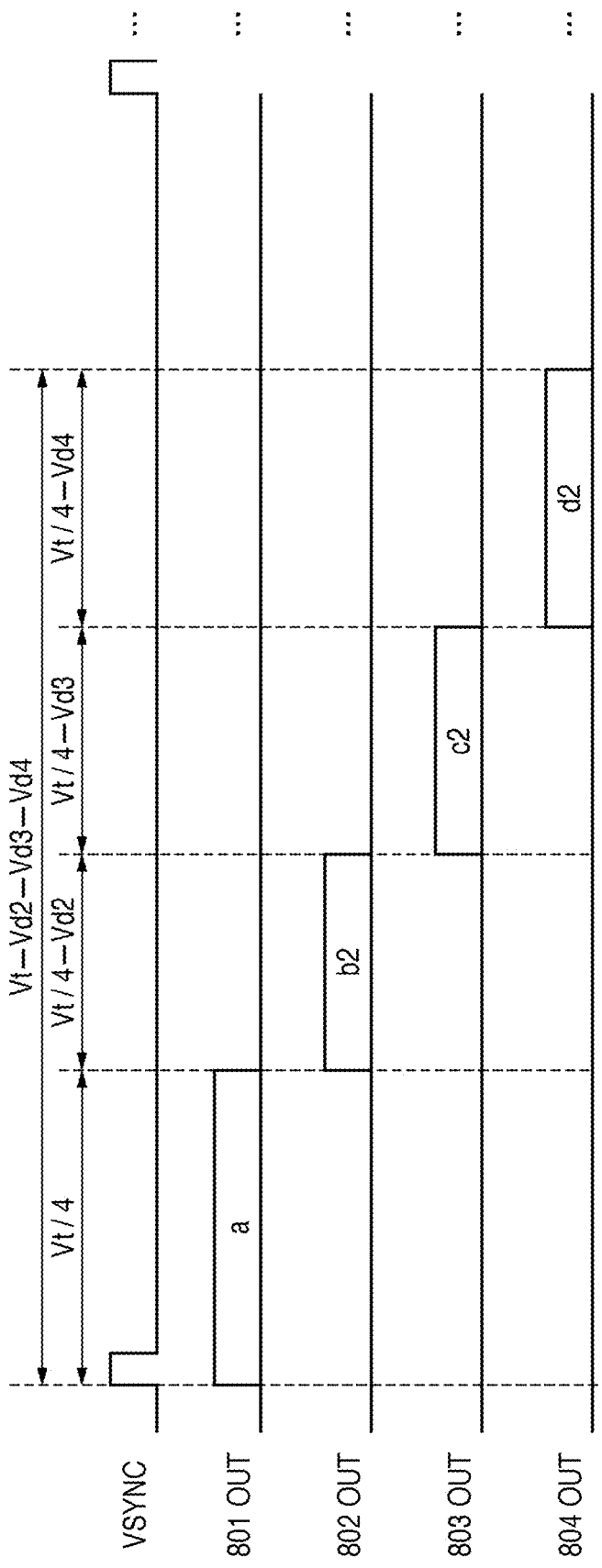

PROJECTION APPARATUS AND CONTROL METHOD THEREOF

BACKGROUND OF THE INVENTION

1. Field of the Invention

The present invention relates to a technique of projecting an image upon applying trapezoid distortion correction.

2. Description of the Related Art

A projection apparatus such as a liquid crystal projector must often perform projection onto a projection plane such as a screen from, for example, above or below at a position at which it does not come up against the projection plane when, for example, its available installation space is limited or when it must be installed so as not to obstruct the observer's view. In such cases, the angle formed between the optical axis and the projection plane is different from a preset angle at which appropriate projection is possible, so distortion occurs in an image projected onto the projection plane. When, for example, a rectangular image is displayed, trapezoid distortion (keystone distortion) occurs.

A technique of detecting the distortion of a projected image, which has occurred due to factors associated with the method of projection onto the projection plane as in this case, and performing trapezoid distortion correction (keystone correction) for a projection image to make the projected image and the projection image similar to each other has been known. Some projection apparatuses even have a function of detecting the distortion of an image on the projection plane from the tilt angle of the projection apparatus and the shape of the projected image, and automatically performing trapezoid distortion correction.

In recent years, with, for example, the launch of digital television broadcasting, the resolution (the number of pixels) of video contents is increasing, so a demand for watching high-resolution video contents using a projection apparatus is naturally growing. To project high-resolution video contents by a projection apparatus, the clock rate for processing one pixel is raised with an increase in number of pixels to play back multi-pixel video contents because the time taken to process one frame of the video contents stays constant.

Unfortunately, when trapezoid distortion correction is performed while projecting high-resolution video contents by a projection apparatus, multiplication processing and memory access associated with trapezoid distortion correction are necessary, so the following problem may be posed. That is, when a high-rate clock is necessary to play back multi-pixel video contents, multiplication processing and memory access associated with trapezoid distortion correction often cannot be completed within one clock cycle, thus slowing down the frame rate.

Japanese Patent Laid-Open No. 2007-251723 discloses a technique of decreasing the number of bits of the color information of a video image with multi-pixel video contents, as mentioned above, thereby preventing a slowdown in frame rate.

However, because Japanese Patent Laid-Open No. 2007-251723 decreases the number of bits of the color information, image degradation may occur in an image to be projected. In trapezoid distortion correction processing accompanied by image enlargement processing, image degradation due to a decrease in number of bits of the color information often conspicuously appears.

Also, although a method of dividing multi-pixel video contents to perform trapezoid distortion correction processing in parallel by a plurality of image processing circuits to shorten the time taken to process the video contents is plausible, no concrete proposal has been presented until now.

SUMMARY OF THE INVENTION

The present invention has been made in consideration of the above-mentioned problem of the prior art. The present invention provides a technique of dividing an image and performing trapezoid distortion correction processing in parallel, thereby shortening the time taken for processing or reducing image degradation.

The present invention in its first aspect provides a projection apparatus which projects an image onto a projection plane based on an input image signal, the apparatus comprising: a division unit configured to divide an image represented by the input image signal into a plurality of regions; a deformation unit configured to deform various types of shapes of the images divided by the division unit; a combination unit configured to combine the images deformed by the deformation unit; and a projection unit configured to project the image combined by the combination unit onto the projection plane.

Further features of the present invention will become apparent from the following description of exemplary embodiments with reference to the attached drawings.

BRIEF DESCRIPTION OF THE DRAWINGS

FIGS. 5A and 5B are block diagrams showing the functional configuration of an image processing unit according to the embodiment;

FIG. 7 is a flowchart of trapezoid distortion correction processing according to the embodiment;

FIG. 12 is a block diagram showing the functional configuration of an image combination unit according to the third embodiment;

FIG. 13 is a timing chart of processing in an image processing unit according to the third embodiment;

FIGS. 15A and 15B are timing charts of processing in an image combination unit in the third embodiment; and FIG. 16 is another timing chart of the processing in the image processing unit according to the embodiment.

DESCRIPTION OF THE EMBODIMENTS

First Embodiment

Preferred embodiments of the present invention will be described in detail below with reference to the accompanying drawings. The embodiments to be described hereinafter will give an example in which the present invention is applied to a liquid crystal projector which exemplifies a projection apparatus and is capable of dividing a projection image and applying trapezoid distortion correction processing to the respective divided images.

Figure 1:
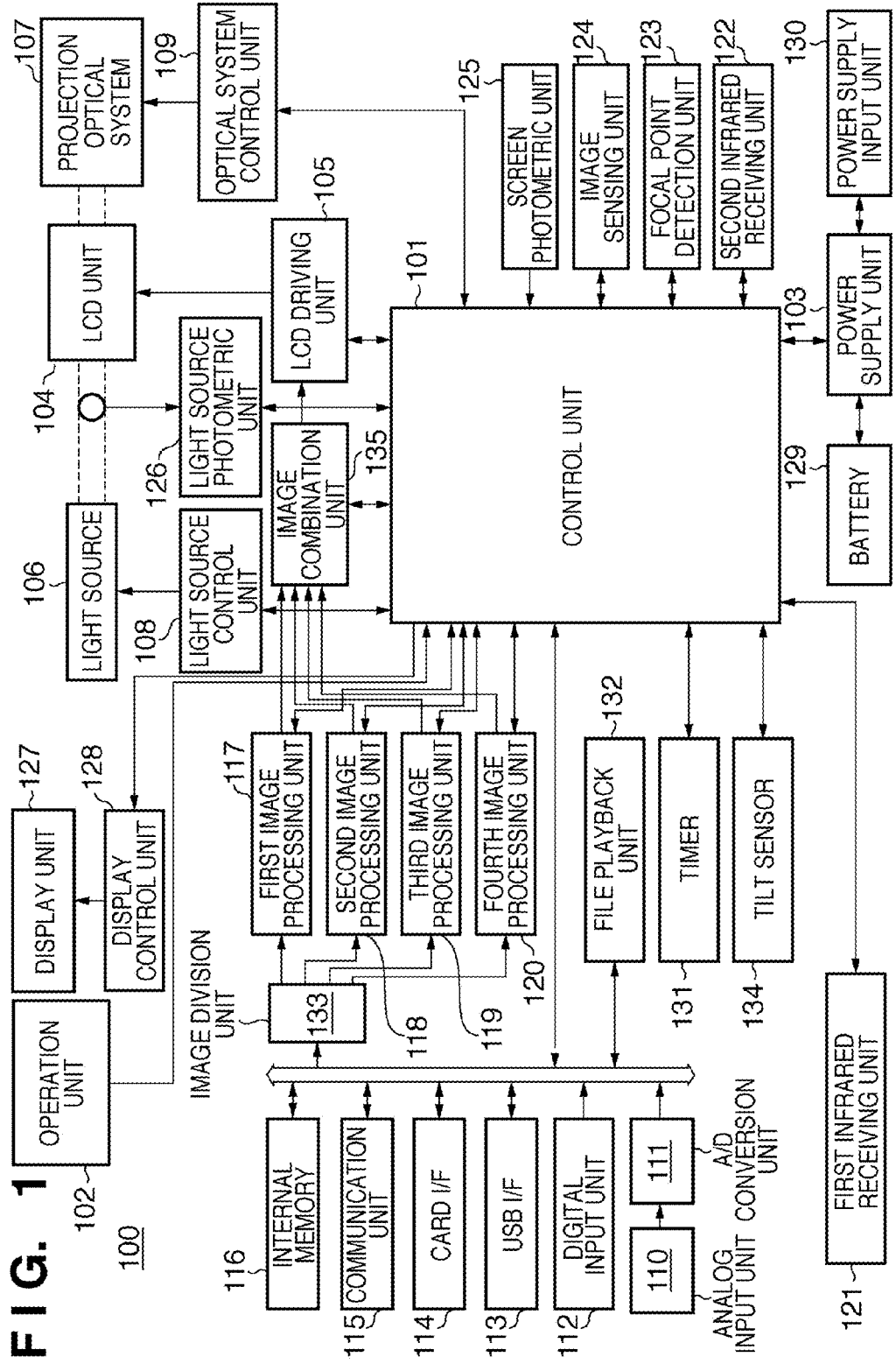
FIG. 1 is a block diagram showing the functional configuration of a liquid crystal projector according to an embodiment.

FIG. 1 is a block diagram showing the functional configuration of a liquid crystal projector 100 according to an embodiment of the present invention. A control unit 101 is, for example, a CPU and controls the operation of each block of the liquid crystal projector 100 by mapping and executing, on a RAM (not shown), a control program which is stored in a nonvolatile memory (not shown) and used for this block of the liquid crystal projector 100. An operation unit 102 is an input interface which is provided in the liquid crystal projector 100 and accepts input from the user, such as a power supply button or a cursor key, and transmits the operation performed by the user to the control unit 101. A first infrared receiving unit 121 and second infrared receiving unit 122 are blocks which are provided on the front and back surfaces of the liquid crystal projector 100 and receive infrared signals. The first infrared receiving unit 121 and second infrared receiving unit 122 analyze infrared signals sent as the user operates a remote controller, and transmit the operations performed by the user to the control unit 101, like the operation unit 102. A display unit 127 is a display such as a compact LCD, and notifies the user of the settings of the liquid crystal projector 100 and displays, for example, GUI data to be presented to the user, under the control of a display control unit 128.

An analog input unit 110, digital input unit 112, USB I/F 113, card I/F 114, communication unit 115, and internal memory 116 are interfaces which are provided in the liquid crystal projector 100 and accept input of video signals. When an analog video signal is input to the analog input unit 110, it is converted into a digital video signal by an A/D conversion unit 111, and input to an image division unit 133. Not only a video signal but also, for example, an image file and a moving image file are input to each input interface, are converted by a file playback unit 132 into video signals capable of being played back by the liquid crystal projector 100, and are transmitted to the image division unit 133.

The image division unit 133 divides one image (projection image) associated with one frame of the input video signal into a plurality of images, and outputs them. The present invention assumes that the liquid crystal projector 100 processes a presented image which has so high a resolution (has so large a number of pixels) that a specific number of frames/sec cannot be achieved when only one image processing unit applies various types of image processing because this image requires processing for a long period of time. Hence, the liquid crystal projector 100 in this embodiment includes four image processing units: a first image processing unit 117, second image processing unit 118, third image processing unit 119, and fourth image processing unit 120, and the image division unit 133 divides a projection image into four regions, and outputs them to the respective image processing units. Note that an image is presented at a timing based on a vertical sync signal (VSYNC) and a horizontal sync signal (HSYNC) which are received together with the input video signal.

The first image processing unit 117, second image processing unit 118, third image processing unit 119, and fourth image processing unit 120 apply various types of image processing to the respective input images in order to present an image to an LCD unit 104 (to be described later), and output the processed images to an image combination unit 135. These image processing units perform, for example, resolution conversion processing of converting the input image to have the display resolution of the LCD unit 104, color tone correction processing, and gamma correction processing. If the LCD unit 104 performs AC driving, the number of frames of the input video signal is doubled and output, thereby making it possible to display an image regardless of the direction of voltage in the LCD unit 104. In the present invention, each image processing unit performs trapezoid distortion correction (keystone correction) processing in which, if a projected image generated upon obliquely projecting a video image onto a screen trapezoidally distorts, the shape of this image is deformed so as to cancel the distortion. Trapezoid distortion correction processing is performed by detecting, for example, the tilt angle of the liquid crystal projector 100 detected by a tilt sensor 134 or the shape of the screen for projection, such as that of the edge of the screen if an image sensing unit 124 is provided, and determining the amount of trapezoid distortion correction. Trapezoid distortion correction processing can be performed with high accuracy using not only the tilt angle information but also the zoom state and optical characteristic information of a projection optical system 107, and the control unit 101 provides these pieces of information to each image processing unit, together with the information of the coordinate positions of the image endpoints after trapezoid distortion correction. When, for example, the user operates the operation unit 102 to set an arbitrary amount of trapezoid distortion correction, each image processing unit performs trapezoid distortion correction processing based on the set value.

The image combination unit 135 combines the images having undergone various types of image processing by the respective image processing units into one image, and outputs it to an LCD driving unit 105. More specifically, the image combination unit 135 temporarily stores the input images in an internal memory of the image combination unit 135, and the control unit 101 reads pixel signals from the internal memory in the raster scanning order, outputs them to the LCD driving unit 105, and displays them on the LCD unit 104. The LCD unit 104 is, for example, a single full-color liquid crystal element or a set of R, G, and B liquid crystal elements, and the LCD driving unit 105 changes the voltage output to each pixel based on the input image signal, thereby forming a projection image on the liquid crystal element or liquid crystal elements. The image formed on the LCD unit 104 is formed (projected) on an external screen (projection plane) via the projection optical system 107 by a light source 106 driven by a light source control unit 108. The light source 106 undergoes light amount control by the light source control unit 108 in accordance with the light amount value calculated such that, for example, the luminance level on the projection plane measured by a screen photometric unit 125 becomes appropriate. The light amount information of the light source 106 is detected by a sensor of a light source photometric unit 126 provided in the optical path, and is fed back to the light source control unit 108. The projection optical system 107 includes lenses such as a zoom lens, a focal lens, and a shift lens, and is driven by an optical system control unit 109 to be able to perform, for example, a change in zoom ratio, focal point adjustment, and projection position control of the projected image. For example, the focal length is calculated from the distance between the screen and the liquid crystal projector 100, which is detected by a focal point detection unit 123, and the control unit 101 causes the optical system control unit 109 to drive the focal lens of the projection optical system 107 based on the calculated focal length.

A power supply input unit 130 is an interface which accepts external input of an AC power, and rectifies the input AC power to a predetermined voltage and supplies it to a power supply unit 103. The power supply unit 103 is a block which supplies, via the control unit 101, a power to each block of the liquid crystal projector 100, which performs power supply driving. The power supply unit 103 also supplies a power to a battery 129 to charge the battery 129, so the battery 129 can be used as an auxiliary power source even when no AC power is input to the power supply input unit 130. A timer 131 detects, for example, the operating time associated with processing in each block of the liquid crystal projector 100.

The liquid crystal projector 100 of this embodiment with the above-mentioned configuration divides one image to be projected into a plurality of images, performs trapezoid distortion correction processing for each image, and thereupon projects one image having undergone trapezoid distortion correction. The overall processing at that time will be described in detail with reference to the accompanying drawings.

Figure 2:
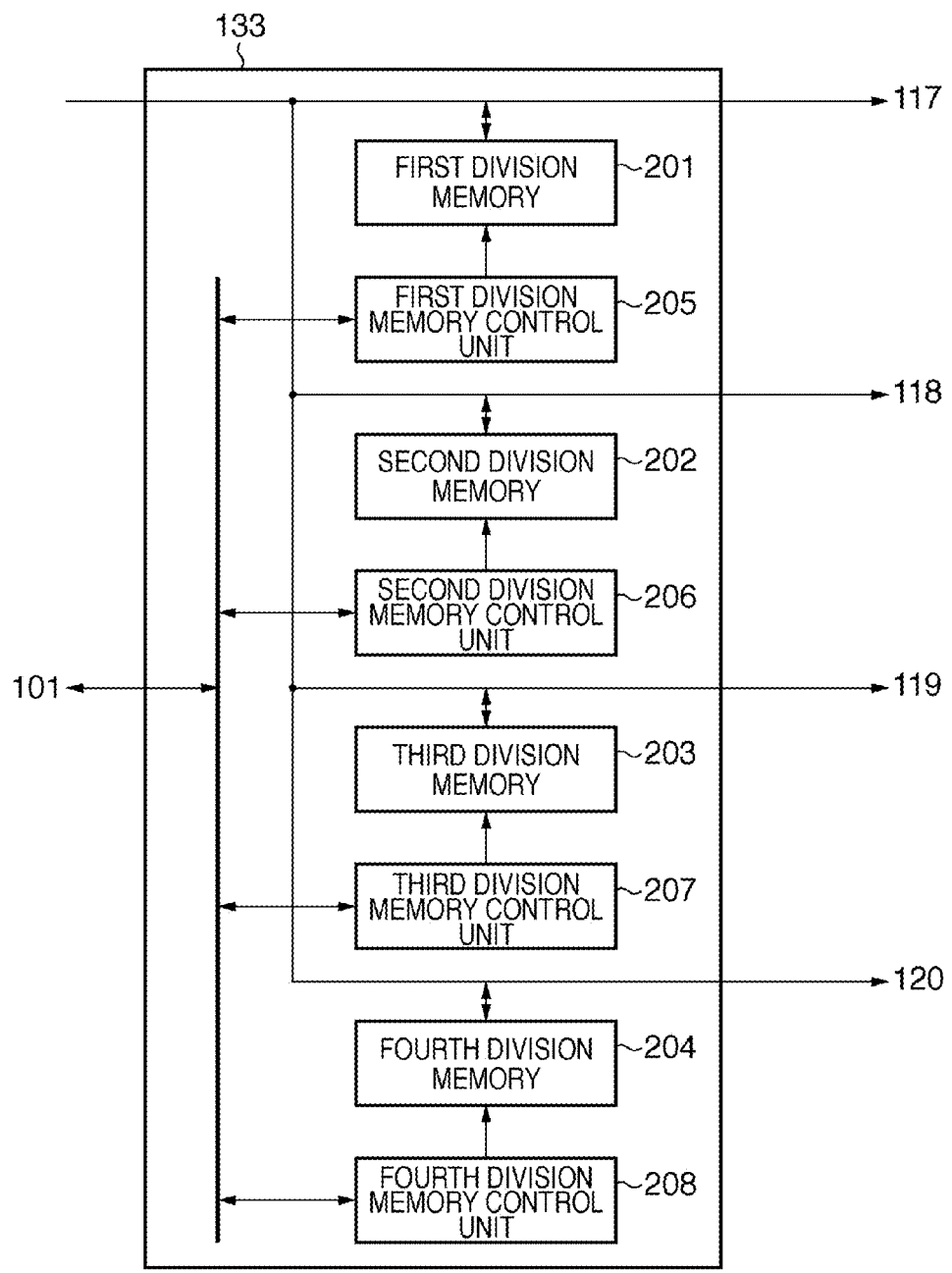
FIG. 2 is a block diagram showing the functional configuration of an image division unit according to the embodiment.
Figure 3A:
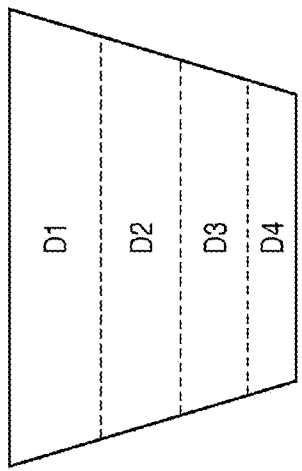
FIGS. 3A, 3B, 3C, and 3D are views for explaining vertical trapezoid distortion correction processing.

An image associated with one frame of a video signal, which is input from an input interface such as the digital input unit 112, is input to the image division unit 133 by the control unit 101. In this embodiment, the image division unit 133 vertically divides the input image into four regions, as shown in FIG. 3A. Hence, the image division unit 133 includes a first division memory 201, second division memory 202, third division memory 203, and fourth division memory 204 which store the divided images, as shown in FIG. 2. The image division unit 133 also includes a first division memory control unit 205, second division memory control unit 206, third division memory control unit 207, and fourth division memory control unit 208 which manage the addresses at which the divided images are stored, and control the timings of input/output to/from the respective image processing units.

Figure 4A:
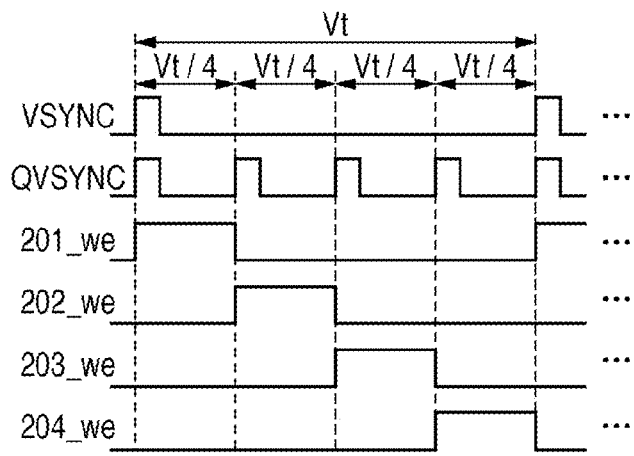
FIGS. 4A, 4B, 4C, 4D, and 4E are timing charts of processing in each block in the first embodiment.
Figure 4B:
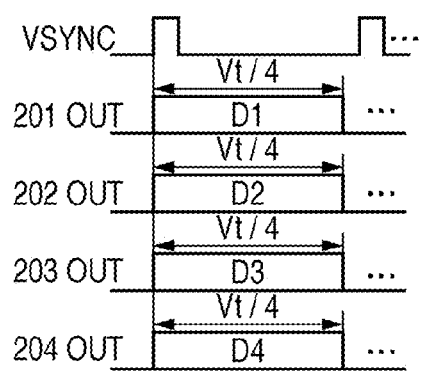

One image input to the image division unit 133 is divided by writing images of regions to be divided on the respective division memories in accordance with an instruction from the control unit 101. Because the image input to the image division unit 133 is read in the scanning order in accordance with the raster scanning direction, VSYNC which is input together with a video signal is used upon vertically dividing the input image into four regions, as in this embodiment. Note that in this embodiment, the raster scanning direction is the horizontal direction (left-to-right direction) and stays the same. Therefore, after pixels on a horizontal line are read (scanned) in turn from the upper left pixel in the image, horizontal scanning in turn from the leftmost pixel on the line immediately under the former line in the image is repeated. Each of the first division memory control unit 205, second division memory control unit 206, third division memory control unit 207, and fourth division memory control unit 208 generates QVSYNC which generates a pulse in a period one-quarter that of input VSYNC. The respective division memory control units send write enable signals for the division memories, chip select (CS) signals, and write address information in different QVSYNC events, as shown in a timing chart of FIG. 4A. Thus, image signals input in the raster scanning order are written on division memories, for which writing is enabled, for each vertical line, and are therefore divided into the four division memories. That is, a region D1 shown in FIG. 3A is written on the first division memory 201, a region D2 shown in FIG. 3A is written on the second division memory 202, a region D3 shown in FIG. 3A is written on the third division memory 203, and a region D4 shown in FIG. 3A is written on the fourth division memory 204. Image signals which are read and divided into the respective division memories in this way are output to the respective image processing units in subsequent stages, in accordance with the VSYNC signal, as shown in a timing chart of FIG. 4B.

The four image processing units apply in parallel image processing to the four image signals divided by the image division unit 133. Since all of the first image processing unit 117, second image processing unit 118, third image processing unit 119, and fourth image processing unit 120 have the same configuration, processing in each image processing unit will be described below by taking the first image processing unit 117 as an example.

FIG. 5A is a block diagram showing the functional configuration of the first image processing unit 117.

The image signal input to the first image processing unit 117 is stored at the designated address in a first image processing memory 801 by a first image processing memory control unit 505, is transmitted to a resolution conversion unit 501 in accordance with an instruction from the control unit 101, and undergoes resolution conversion processing. The resolution conversion unit 501 converts the input image to have a predetermined resolution in accordance with the settings of the LCD unit 104, and the first image processing memory control unit 505 stores the converted image at the designated address in the first image processing memory 801 again. This embodiment assumes that the first image processing memory 801 has a minimum capacity necessary to perform various types of image processing by the first image processing unit 117. That is, the image output from the resolution conversion unit 501 is stored from the start address of the first image processing memory 801, and is overwritten and stored at the address at which the image input to the first image processing unit 117 is stored. However, if the first image processing memory 801 has a sufficient available area, the image having undergone resolution conversion processing and the image input to the first image processing unit 117 may be stored at different addresses to coexist with each other.

Figure 3B:
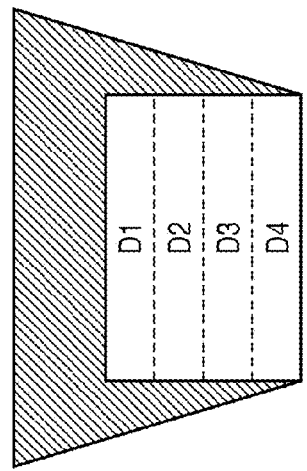
Figure 3C:
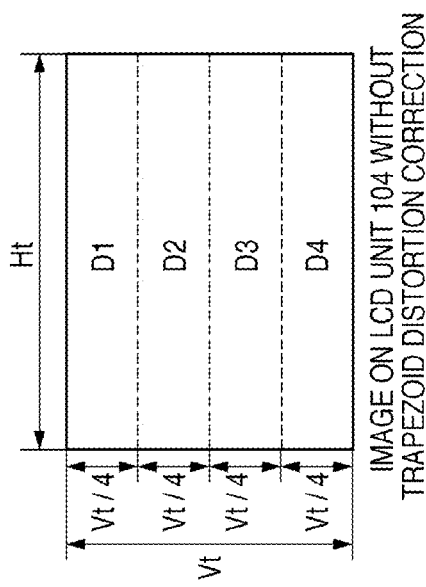
Figure 3D:
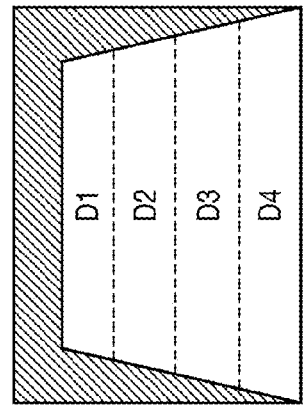

A trapezoid distortion correction unit 502 applies trapezoid distortion correction processing to the image having undergone resolution conversion by the resolution conversion unit 501. This embodiment assumes trapezoid distortion correction when, for example, projection onto a screen serving as a projection plane is performed while the liquid crystal projector 100 is launched from a position below the screen (the liquid crystal projector 100 has an elevation angle with respect to the screen). When the liquid crystal projector 100 is launched from a position below the screen, and an image, as shown in FIG. 3A, is projected, the projected image is stretched and trapezoidally deforms (distorts) on the screen, as shown in FIG. 3B. At this time, by deforming the image shown in FIG. 3A into a trapezoidal shape, as shown in FIG. 3C, by trapezoid distortion correction processing, and projecting the deformed image, an image which has a shape similar to the image shown in FIG. 3A as a result of distortion correction can be projected onto the screen, as shown in FIG. 3D. In the present invention, the trapezoid distortion correction unit of each image processing unit applies trapezoid distortion correction processing corresponding to the coordinate position to the corresponding divided image.

The functional configuration of the trapezoid distortion correction unit 502 will be described in more detail herein with reference to a block diagram shown in FIG. 5B.

A trapezoid distortion correction memory control unit 511 is a block which controls processing of the trapezoid distortion correction unit 502. The resolution conversion unit 501 trapezoid distortion correction memory control unit 511 obtains the image, which has undergone resolution conversion by the resolution conversion unit 501 and undergoes trapezoid distortion correction processing, from the first image processing memory 801 in response to an instruction from the control unit 101, and stores it in a block memory 512. At this time, a coordinate calculation unit 514 (to be described later) determines the information of pixels read out by the trapezoid distortion correction memory control unit 511, and that of the addresses in the block memory 512, at which the readout pixels are stored.

The coordinate calculation unit 514 receives, from the control unit 101, the tilt angle, the zoom state and optical characteristic information of the projection optical system 107, and the coordinate values of the endpoints at the four corners of the image after trapezoid distortion correction. The coordinate calculation unit 514 calculates the coordinate position of the image after trapezoid distortion correction, and coordinate-associated information indicating the correspondence of the image after trapezoid distortion correction, based on the pieces of received information. The coordinate-associated information means information indicating the address at which the information of a pixel at an arbitrary coordinate position after trapezoid distortion correction is stored in the divided image stored in the first image processing memory 801. Although a method of performing trapezoid distortion correction by extracting and arranging the information of pixels after trapezoid distortion correction from pixels in an image before trapezoid distortion correction will be described in this embodiment, the trapezoid distortion correction method is not limited to this. For example, the color information of pixels after correction may be calculated from the color information of a plurality of pixels before correction. The thus calculated coordinate-associated information is transmitted to the trapezoid distortion correction memory control unit 511, and the trapezoid distortion correction memory control unit 511 reads out the image information from the first image processing memory 801 based on the coordinate-associated information, and stores it in the block memory 512. At this time, the image information after trapezoid distortion correction is stored in the block memory 512 in the raster scanning order.

A filter processing unit 513 applies interpolation processing such as linear interpolation or bicubic interpolation to the image information which has undergone trapezoid distortion correction processing and is stored in the block memory 512. After applying interpolation processing to the images stored in the block memory 512, the filter processing unit 513 outputs the obtained images so that they are stored at addresses in the first image processing memory 801 in the raster scanning order again. Note that the first image processing memory control unit 505 controls the addresses at which the images having undergone trapezoid distortion correction processing are stored in the first image processing memory 801.

(Trapezoid Distortion Correction Processing)

Trapezoid distortion correction processing executed by the trapezoid distortion correction unit 502 in this embodiment with the above-mentioned configuration will be described with reference to a flowchart shown in FIG. 7. This embodiment assumes that the control unit 101 starts trapezoid distortion correction processing when the tilt angle of the liquid crystal projector 100 is detected by the tilt sensor 134 and one image to be projected is divided by the image division unit 133 and input to each image processing unit. However, the control unit 101 needs only start this trapezoid distortion correction processing at least before each image processing unit applies it.

Figure 6A:
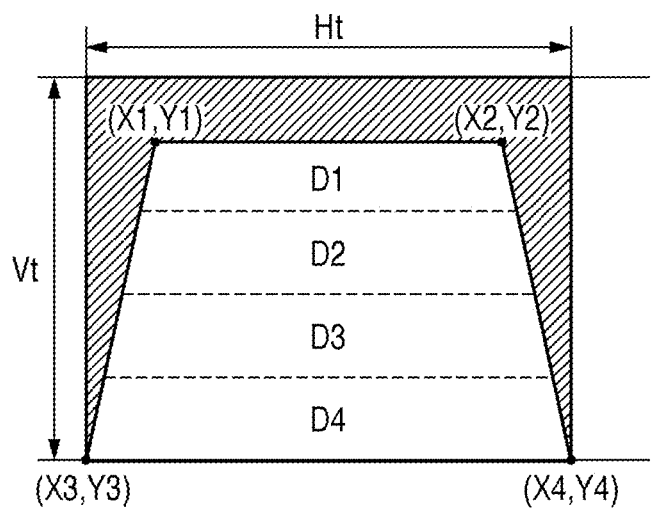
FIGS. 6A, 6B, and 6C are views for explaining trapezoid distortion correction processing in the first embodiment.

In step S701, the control unit 101 obtains the information of the current tilt angle of the liquid crystal projector 100 from the tilt sensor 134 to determine the positional relationship between the liquid crystal projector 100 and the screen. The control unit 101 calculates the amount of deformation necessary to display the image projected on the screen in a shape similar to the image to be projected, from the obtained information of the tilt angle (S702). More specifically, when the projection image is, for example, an image including Ht×Vt pixels, the control unit 101 calculates the information of the endpoints of a trapezoid, as shown in FIG. 6A, in which the projected image is displayed in a shape similar to the projection image, based on the obtained tilt angle.

Figure 6B:
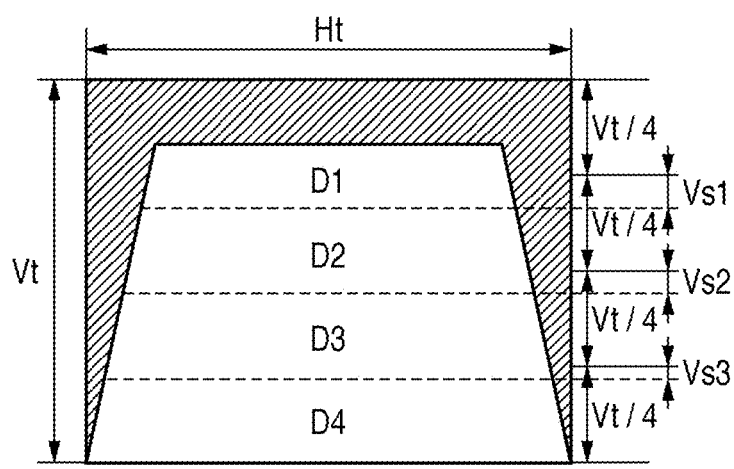

In step S703, the control unit 101 determines the amount of image shift. The amount of image shift means information indicating the amount by which the position at which an image obtained by applying trapezoid distortion correction processing to an image obtained by dividing the projection image is located shifts from the position before correction in a trapezoidal image obtained by applying trapezoid distortion correction processing to the projection image without division. For example, when the projection image is vertically divided into four regions D1, D2, D3, and D4, as shown in FIG. 3A, each divided image has the information of a region including Ht×Vt/4 pixels. In contrast to this, in an image which includes Ht×Vt pixels and is projected after application of trapezoid distortion correction processing, image signals are present in a trapezoidal region represented by endpoints (X1, Y1), (X2, Y2), (X3, Y3), and (X4, Y4). At this time, image signals obtained upon applying trapezoid distortion correction processing to each divided image by the corresponding image processing unit are arranged, as shown in FIG. 6A. That is, images having undergone trapezoid distortion correction processing in the respective regions each including Ht×Vt/4 pixels are located at positions shifted by Vs1, Vs2, and Vs3, respectively, from the coordinate position of the lower edge before correction, as shown in FIG. 6B, in the image to be projected. After applying trapezoid distortion correction processing in this way, the control unit 101 calculates, as the amount of image shift, the amount of shift to the coordinate position at which the corrected image is located.

Figure 6C:
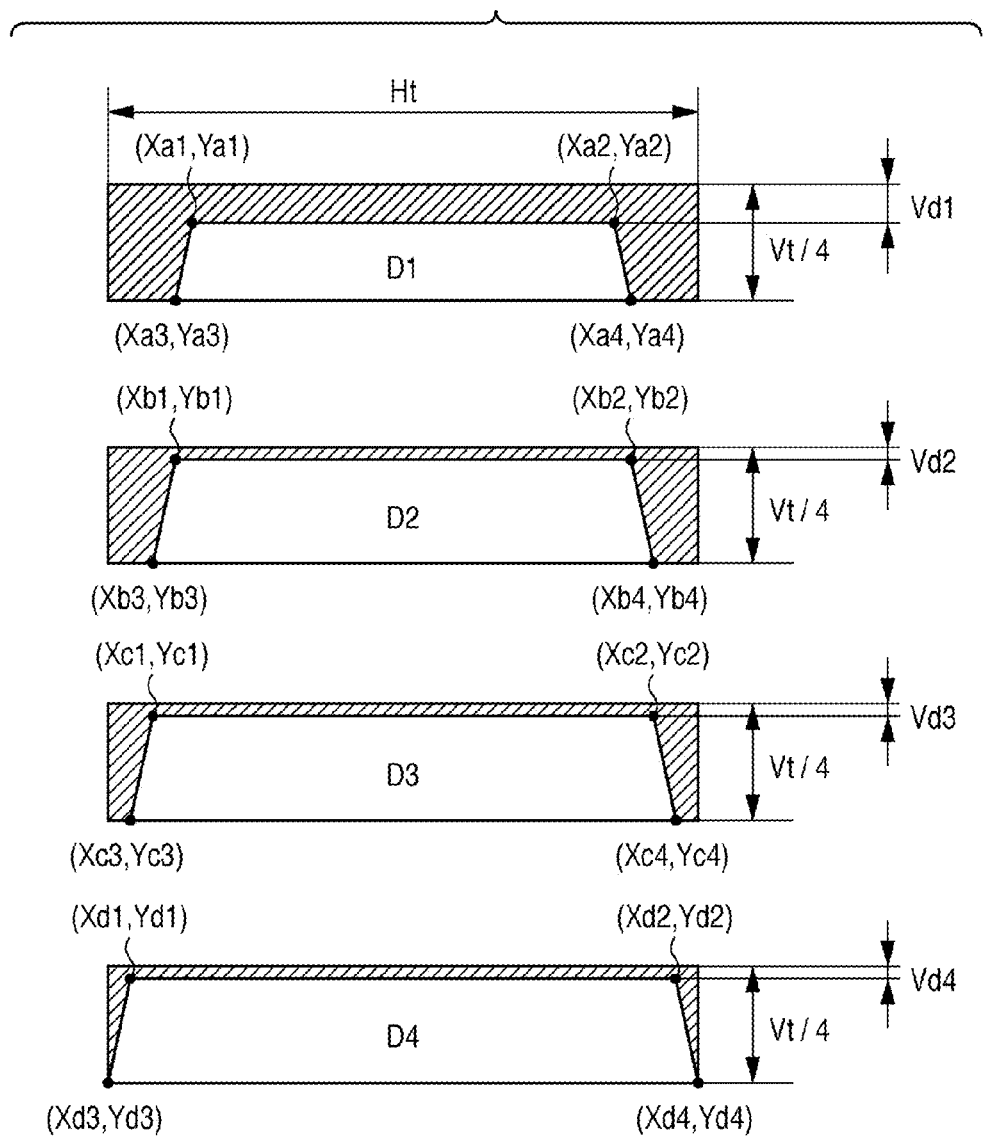

In step S704, the control unit 101 determines the information of the coordinate positions of the image endpoints after applying trapezoid distortion correction processing for each of the divided images input to the respective image processing units, based on the amount of image shift determined in step S703, and transmits this information to each image processing unit. FIG. 6C is a view showing the coordinate positions of the endpoints, after applying trapezoid distortion correction processing, of the divided image input to each image processing unit. For example, the image of the region D1 corresponding to the uppermost region upon vertically dividing the projection image into four regions has endpoints at coordinate positions (Xa1, Ya1), (Xa2, Ya2), (Xa3, Ya3), and (Xa4, Ya4). Because the region D1 needs to shift by the line Vs1 in the image to be finally projected, as shown in FIG. 6B, Ya1=Y1−Vs1 (the downward direction in the image is defined as the positive direction). Because vertical reduction processing is included in the process of trapezoid distortion correction in this embodiment, a line on which no image signals associated with the projection image are present is generated in each divided image. The line on which no image signals associated with the projection image are present means a line which is independent of the projection image and is generated because an image associated with the projection image is reduced horizontally or vertically upon applying trapezoid distortion correction processing to an image obtained by dividing the projection image. A pixel which is independent of the projection image and is generated upon trapezoid distortion correction, such as a pixel on a line on which no image signals associated with the projection image are present, is regarded as having no signal and is processed as a pixel having, for example, information indicating no signal or black information. Referring to FIG. 6C, there are four lines Vd1, Vd2, Vd3, and Vd4 on which no image signals are present.

In step S705, under the control of the control unit 101, the trapezoid distortion correction memory control unit 511 causes the coordinate calculation unit 514 to calculate the coordinate-associated information before and after trapezoid distortion correction, using the input information of the coordinate positions of the image endpoints after applying trapezoid distortion correction processing. The trapezoid distortion correction memory control unit 511 then obtains the information of pixels, which form an image after trapezoid distortion correction, from the first image processing memory 801 based on the coordinate-associated information, and stores it in the block memory 512 in the raster scanning order. Note that when the information of pixels is arranged in the block memory 512 in the raster scanning order, these pixels are stored at addresses in the block memory 512 in the following way. For example, the image of the region D1 has the line Vd1 in the scanning direction, on which no image signals are present, upon applying trapezoid distortion correction processing, as shown in FIG. 6C. Therefore, no image signals are stored in the block memory 512 at addresses corresponding to the first line Vd1 from the start address, and information indicating no signals is stored in the block memory 512 for the line Vd1. As for addresses on a line immediately under the line Vd1, no signals are present at addresses corresponding to the coordinate of the left edge to the coordinate Xa1, image signals are present at addresses corresponding to the coordinates Xa1 to Xa2, and no signals are present at addresses corresponding to the coordinate next to Xa2 to the last coordinate (Ht) on this line. In this manner, the information of all pixels after trapezoid distortion correction is stored in the block memory 512 such that the image information having undergone trapezoid distortion correction processing is read in the scanning order upon reading the information of pixels in a specific order of address from the block memory 512.

After that, under the control of the control unit 101, the trapezoid distortion correction memory control unit 511 applies interpolation processing by the first image processing unit 117 to the image which has undergone trapezoid distortion correction processing and is stored in the block memory 512, and outputs the processed image to the first image processing memory 801. At this time, the image output from the filter processing unit 513 of the trapezoid distortion correction unit 502 is stored at the designated address in the first image processing memory 801 by the first image processing memory control unit 505. Note that the image having undergone trapezoid distortion correction processing can also be overwritten and stored at the address at which the image having undergone resolution conversion processing is stored in the first image processing memory 801, as has been described above in relation to the resolution conversion unit 501.

After the image after trapezoid distortion correction is stored in the first image processing memory 801 in this way, the control unit 101 ends the trapezoid distortion correction processing upon receiving information indicating that storage of the image having undergone trapezoid distortion correction processing from the trapezoid distortion correction memory control unit 511 to the first image processing memory 801 is completed.

After the image having undergone trapezoid distortion correction processing by the trapezoid distortion correction unit 502 undergoes image quality correction processing by a gamma correction unit 503 and unevenness correction unit 504, the processed image is stored at the designated address in the first image processing memory 801 by the first image processing memory control unit 505.

Figure 8:
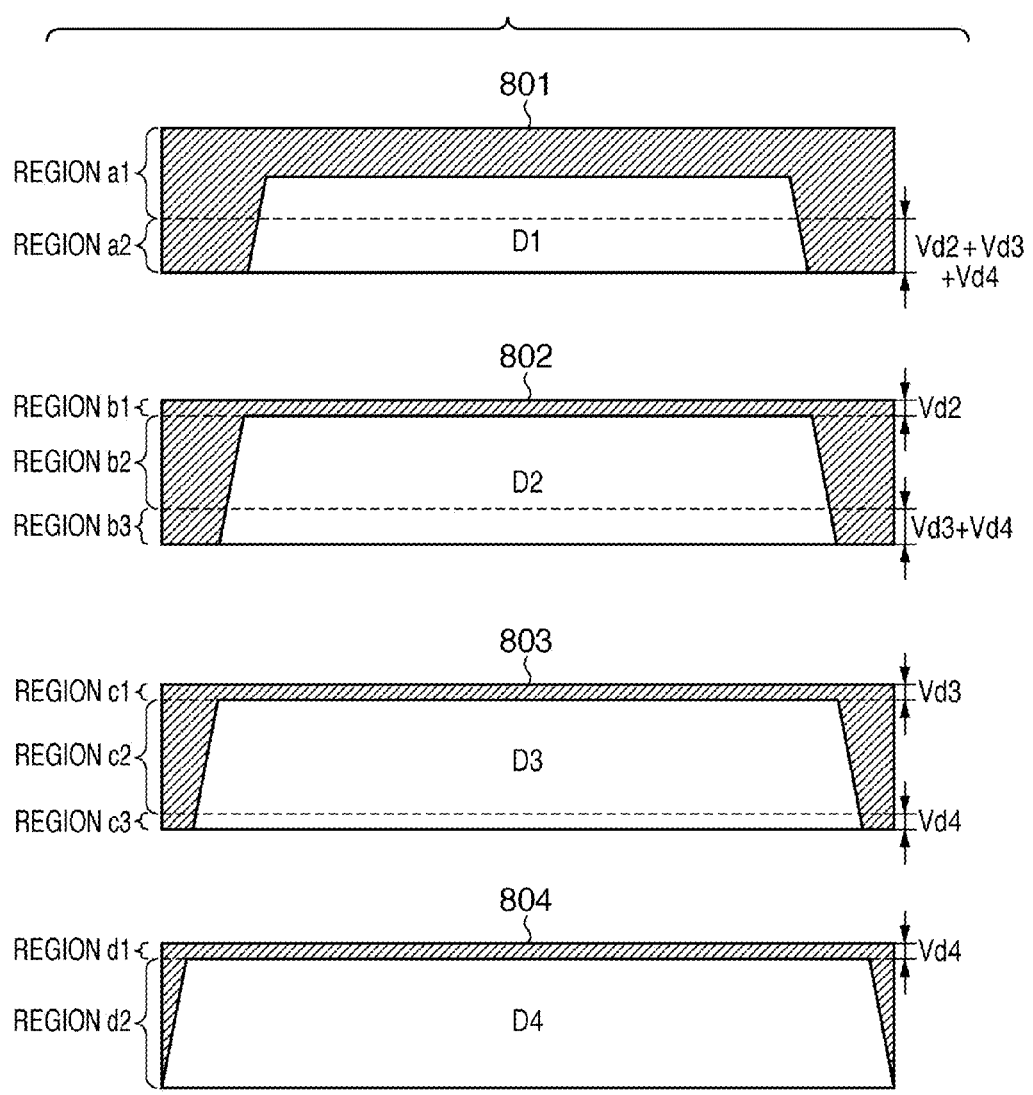
FIG. 8 is a view for explaining classified image regions according to the first embodiment.

As described above, when each image processing unit performs various types of image processing including trapezoid distortion correction processing, pieces of image information, as shown in FIG. 8, are stored in the first image processing memory 801, a second image processing memory 802, a third image processing memory 803, and a fourth image processing memory 804. Images which have undergone trapezoid distortion correction processing and include lines on which no image signals are present are stored at addresses in all these image processing memories such that that they are read out in the raster scanning order by the image combination unit 135.

(Image Combination Processing)

As described above, after the images undergo various types of image processing by the respective image processing units, they are combined by the image combination unit 135, thereby allowing the liquid crystal projector 100 in this embodiment to project an image having undergone trapezoid distortion correction, as in the case in which one image is projected upon trapezoid distortion correction. Image combination processing by the image combination unit 135 will be described in detail below.

Figure 9:
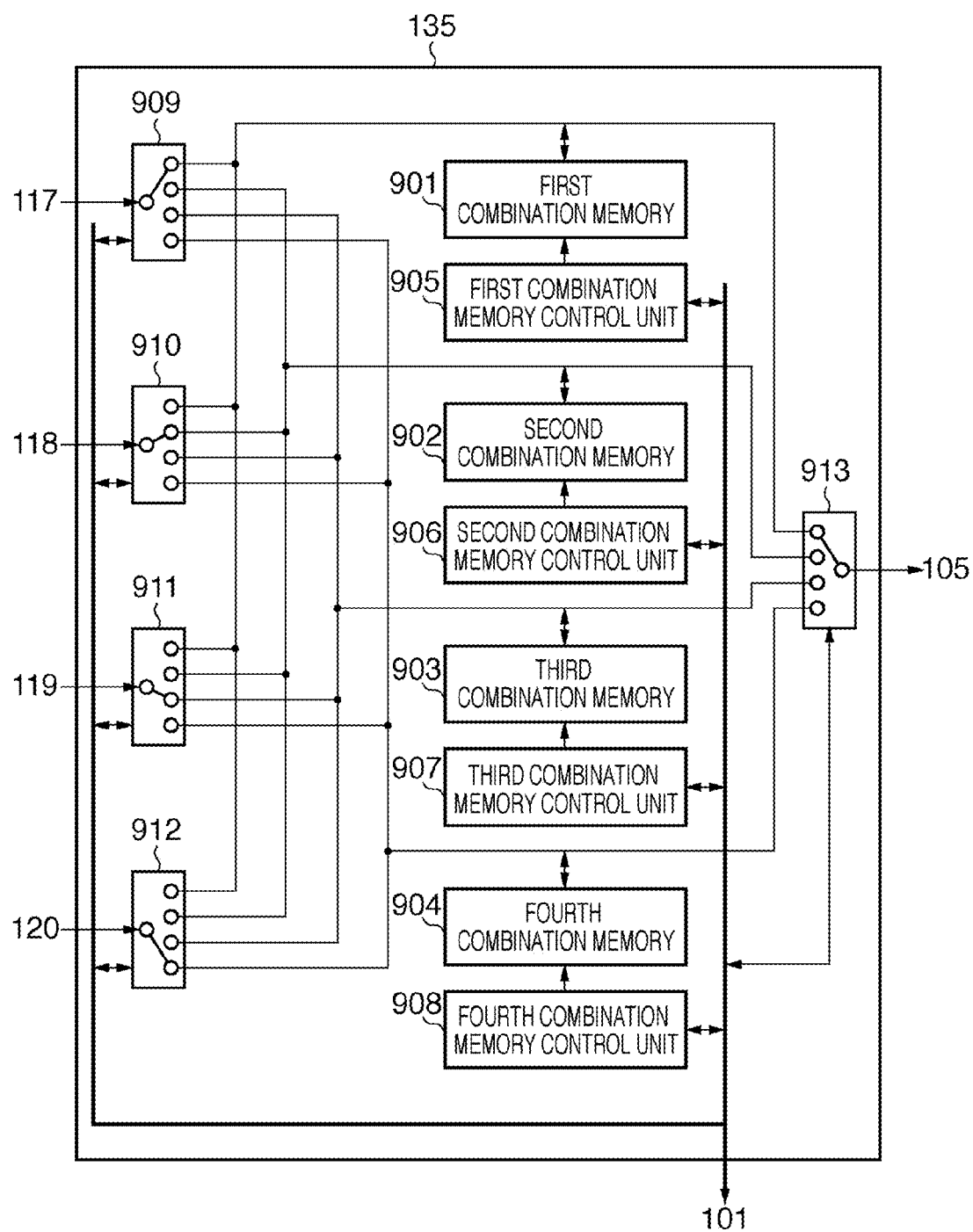
FIG. 9 is a block diagram showing the functional configuration of an image combination unit according to the embodiment.

FIG. 9 is a block diagram showing the functional configuration of the image combination unit 135.

The image combination unit 135 includes a first combination memory 901, second combination memory 902, third combination memory 903, and fourth combination memory 904 which store images. The image combination unit 135 also includes a first combination memory control unit 905, second combination memory control unit 906, third combination memory control unit 907, and fourth combination memory control unit 908 which control readout and writing of the respective combination memories. The image combination unit 135 moreover includes selectors 909, 910, 911, and 912 which are used to switch the combination memories that store the images input from the respective image processing units, and a selector 913 which is used to select a combination memory for readout in order to output an image to the LCD driving unit 105.

In this embodiment, when the image signals are read out to the respective combination memories in a specific order of address from the first combination memory 901 to the fourth combination memory 904, they are stored in the respective combination memories in the scanning order of one image which has undergone trapezoid distortion correction processing and is to be projected. That is, the images which have undergone trapezoid distortion correction processing and are input from the respective image processing units to the image combination unit 135 are input to the combination memories that are storage destinations by the selectors 909 to 912, and pieces of information of images obtained by vertically dividing an image to be projected into four regions are stored in the respective combination memories.

Image combination processing on a plurality of combination memories by the image combination unit 135 will be described below with reference to the accompanying drawings.

The images having undergone various types of image processing by the respective image processing units are stored in the respective image processing memories, as shown in FIG.

8. At this time, the images stored in the respective image processing memories include lines Vd1, Vd2, Vd3, and Vd4 on which no image signals are present. To store the images to be projected in the first combination memory 901 to the fourth combination memory 904 in the raster scanning order when they are input to the image combination unit 135, it is necessary to move those lines on which no image signals are present to prevent lines on which image signals are present from becoming discontinuous. Hence, in this embodiment, the image stored in each image processing memory is divided into regions, as shown in FIG. 8.

The image stored in the fourth image processing memory 804 is divided into two regions: a region d1 corresponding to the line Vd4 on which no image signals are present from the upper edge of the image, and the remaining region d2. The image stored in the third image processing memory 803 is divided into three regions: a region c1 corresponding to the line Vd3 on which no image signals are present from the upper edge of the image, a region c3 corresponding to the line Vd4 from the lower edge of the image, and the remaining region c2. The image stored in the second image processing memory 802 is divided into three regions: a region b1 corresponding to the line Vd2 on which no image signals are present from the upper edge of the image, a region b3 corresponding to the sum of the lines Vd3 and Vd4 from the lower edge of the image, and the remaining region b2. The image stored in the first image processing memory 801 is divided into two regions: a region a2 corresponding to the sum of the lines Vd2, Vd3, and Vd4 from the lower edge of the image, and the remaining region a1. The thus divided regions are input to selectors used to select combination memories which store the images input from the respective image processing units in the following way, thereby making it possible to transmit and store them in the respective combination memories.

Figure 4C:
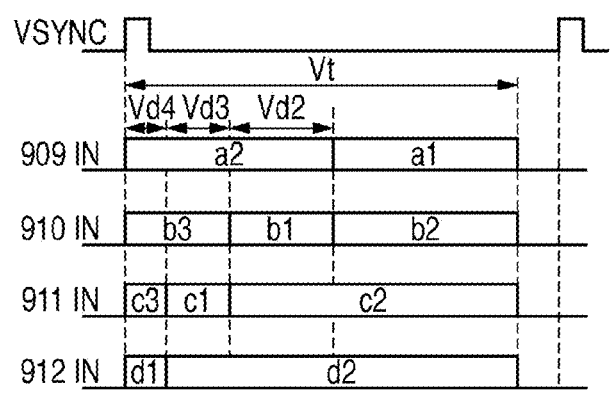

The order in which the image regions are input to each selector will be described first with reference to FIG. 4C.

The first image processing memory control unit 505 of the first image processing unit 117 inputs the images from the first image processing memory 801 to the selector 909 in the order of the regions a2 and a1 by the raster scanning scheme within the VSYNC period. A second image processing memory control unit (not shown) of the second image processing unit 118 inputs the images from the second image processing memory 802 to the selector 910 in the order of the regions b3, b1, and b2 by the raster scanning scheme within the VSYNC period. A third image processing memory control unit (not shown) of the third image processing unit 119 inputs the images from the third image processing memory 803 to the selector 911 in the order of the regions c3, c1, and c2 by the raster scanning scheme within the VSYNC period. A fourth image processing memory control unit (not shown) of the fourth image processing unit 120 inputs the images from the fourth image processing memory 804 to the selector 912 in the order of the regions d1 and d2 by the raster scanning scheme within the VSYNC period.

Figure 4D:
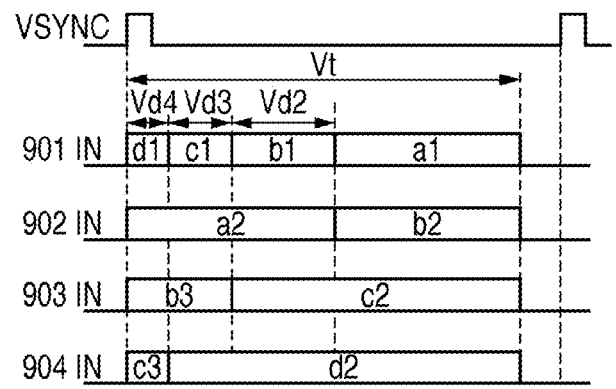

The order in which the image regions are input to each combination memory will be described next with reference to FIG. 4D.

The first combination memory 901 is selected first by the selector 912 to receive the image of the region d1 via the selector 912, and is selected next by the selector 911 to receive the image of the region c1 via the selector 911. Further, the first combination memory 901 is selected by the selector 910 to receive the image of the region b1 via the selector 910, and is selected lastly by the selector 909 to receive the image of the region a1 via the selector 909. With this processing, the lines Vd4, Vd3, and Vd2 on which no image signals are present in the image processing memories are stored in the first combination memory 901 earlier, and the region a1 with a line on which an image signal starts to appear is stored later. That is, among images obtained by vertically dividing one image to be projected upon applying trapezoid distortion correction processing into four regions, images located at the uppermost positions are stored in the first combination memory 901 in the raster scanning order.

The second combination memory 902 is selected first by the selector 909 to receive the image of the region a2 via the selector 909, and is selected next by the selector 910 to receive the image of the region b2 via the selector 910. With this processing, among images obtained by vertically dividing one image to be projected upon applying trapezoid distortion correction processing into four regions, images located at the second positions from the tops are stored in the second combination memory 902 in the raster scanning order.

The third combination memory 903 is selected first by the selector 910 to receive the image of the region b3 via the selector 910, and is selected next by the selector 911 to receive the image of the region c2 via the selector 911. With this processing, among images obtained by vertically dividing one image to be projected upon applying trapezoid distortion correction processing into four regions, images located at the second positions from the bottoms are stored in the third combination memory 903.

The fourth combination memory 904 is selected first by the selector 911 to receive the image of the region c3 via the selector 911, and is selected next by the selector 912 to receive the image of the region d2 via the selector 912. With this processing, among images obtained by vertically dividing one image to be projected upon applying trapezoid distortion correction processing into four regions, images located at the lowermost positions are stored in the fourth combination memory 904 in the raster scanning order.

In this way, one image to be projected upon applying trapezoid distortion correction processing can be divided and stored in the first combination memory 901 to the fourth combination memory 904 in the raster scanning order. Also, as shown in FIG. 4D, by dividing and transmitting image regions stored in each image processing memory, as described above, image combination processing can be completed without delay of storage processing due to simultaneous access to each combination memory. That is, in reading the image from each image processing unit, the image combination unit 135 performs control of the image regions to be read out from each image processing unit and control of selection of a combination memory on which the input image is written, thereby being able to write an image to be projected on the combination memory within the VSYNC period.

Figure 4E:
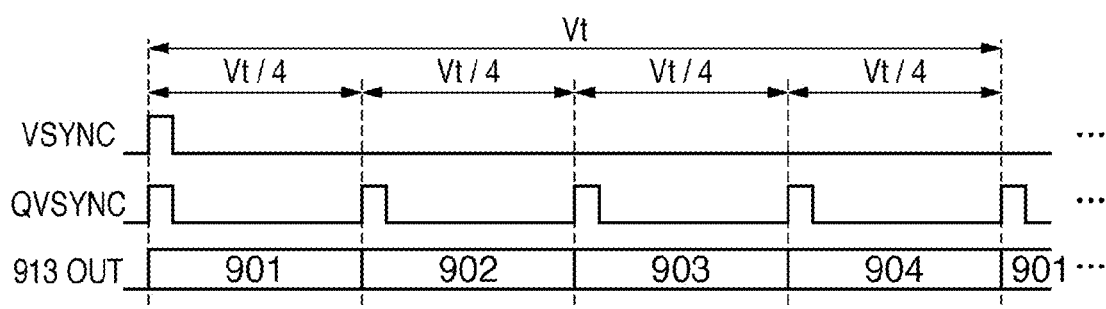

Note that one image which is thus stored in each combination memory and is to be projected upon applying trapezoid distortion correction processing is read out in turn from the first combination memory 901 for each QVSYNC event and is output to the LCD driving unit 105 by each combination memory control unit, as shown in FIG. 4E. The control unit 101 controls the selector 913 and each combination memory control unit within the VSYNC period, thereby transmitting an image to be projected to the LCD driving unit 105 and presenting this image on the LCD unit 104. The image formed on the LCD unit 104 is converted into an optical image by means of light emitted by the light source 106, and is projected onto the screen via the projection optical system 107. Note that in this configuration, an operation clock used for readout from each combination memory has a rate about four times that of an operation clock used for writing on this combination memory.

Although a single LCD driving unit 105 is provided in the example described in this embodiment, a plurality of LCD driving units 105, for example, may be provided. In this case, an image to be projected can be formed by transmitting the images stored in the respective combination memories to the plurality of LCD driving units 105, respectively, and driving the regions on the LCD unit 104, which are respectively assigned to these images, using the LCD driving units. In this case, the operating speed for readout from each combination memory can be made nearly equal to that for writing on this combination memory. Also, in this embodiment, the images are projected in the raster scanning order upon being read out in turn from the first combination memory 901, second combination memory 902, third combination memory 903, and fourth combination memory 904 from the start address of each combination memory. However, the practice of the present invention is not limited to this, and the images need only be projected in the raster scanning order upon being read out and projected in projection after trapezoid distortion correction in at least the same order of address as that in which they are read out in projection without trapezoid distortion correction.

As has been described above, in projecting a projection image upon performing trapezoid distortion correction, the projection apparatus in this embodiment divides the projection image, combines the divided images having undergone trapezoid distortion correction, and projects the combined image. More specifically, the projection apparatus divides one projection image into a plurality of divided images, applies trapezoid distortion correction which uses corresponding amounts of correction to the plurality of divided images, and stores the corrected images in storage areas having an addressing structure. At this time, the addresses of the storage areas in which the images are stored are determined such that when the images are read out in the same order of address as that in which they are read out in projection without trapezoid distortion correction, they are read out in the scanning order used in projecting one image having undergone trapezoid distortion correction.

The plurality of divided images having undergone trapezoid distortion correction include lines on which image signals are present, and lines on which no image signals are present. Hence, the addresses for storage are controlled to prevent the lines on which image signals are present from becoming discontinuous in storing the plurality of images having undergone trapezoid distortion correction in the storage areas.

Thus, because the projection apparatus applies trapezoid distortion correction processing to the divided images in a plurality of image processing circuits, it is possible to shorten the time taken for trapezoid distortion correction processing, and therefore to project a multi-pixel image without slowing down the rendering frame rate. Also, because the projection apparatus performs arithmetic processing in parallel using a plurality of image processing circuits, there is no need to perform processing for reducing the amount of arithmetic operation, such as a decrease in amount of color information, thus making it possible to reduce image degradation. Moreover, because the addresses of the storage areas in which a plurality of images having undergone trapezoid distortion correction are stored are controlled to be able to read out and project the images in the scanning order, it is possible to facilitate readout of images associated with projection, like the conventional scheme in which an image is projected upon performing trapezoid distortion correction without division.

Second Embodiment

Figure 10A:
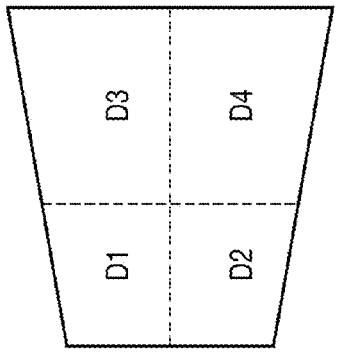
FIGS. 10A, 10B, 10C, 10D, and 10E are views for explaining horizontal trapezoid distortion correction processing.
Figure 10B:
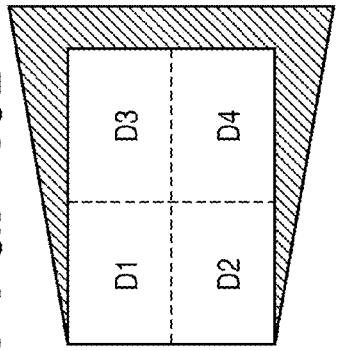

In the example described in the first embodiment, an image is vertically divided into four regions using lines running parallel to the scanning direction, and trapezoid distortion correction processing in a direction (vertical direction) perpendicular to the scanning direction is applied to the divided images. An example in which a projection image is divided into four regions using two orthogonal lines which pass through the center of the image, as shown in FIG. 10A, and trapezoid distortion correction processing for correcting distortion generated, as shown in FIG. 10B, is applied to the divided images, will be described in the second embodiment. That is, the overall processing when one image having undergone trapezoid distortion correction is projected after an image is divided using a line perpendicular to the scanning direction, and trapezoid distortion correction processing in the same direction (horizontal direction) as the scanning direction is applied to the divided images, will be described. Note that a liquid crystal projector which exemplifies the projection apparatus in the second embodiment to be described hereinafter has the same functional configuration as in the first embodiment, and a description of each block will not be given.

Figure 10C:
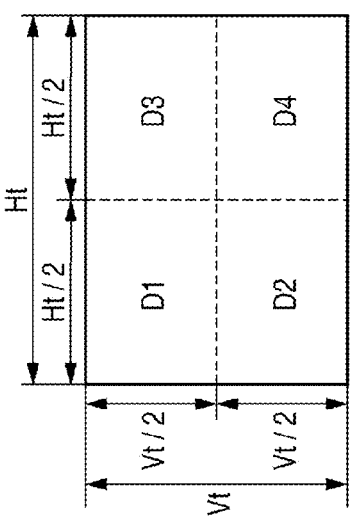
Figure 10D:
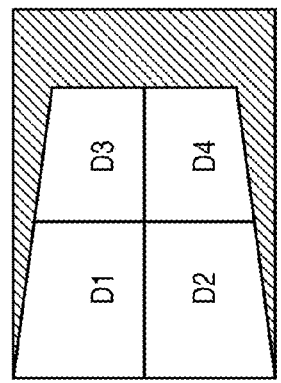

A liquid crystal projector 100 in this embodiment is placed on the left side of a screen and performs projection onto the screen in this state. At this time, a rectangular image, as shown in FIG. 10A, distorts in a trapezoidal shape in which the right edge of the image is vertically stretched, as shown in FIG. 10B, upon projection. By applying trapezoid distortion correction processing to deform the rectangular image to be projected into a shape, as shown in FIG. 10C, an image similar to the rectangular image to be projected can be projected onto the screen, as shown in FIG. 10D.

Detailed processing associated with trapezoid distortion correction by an image division unit 133, each image processing unit, and an image combination unit 135 will be described below.

The image division unit 133 divides one image associated with one frame of an input video signal into four regions separated by two orthogonal lines which pass through the center of the image, as described above. More specifically, when the image to be projected is an image including Ht×Vt pixels, as shown in FIG. 10A, the image division unit 133 divides the image into four regions each including (Ht/2)× (Vt/2) pixels.

The image division unit 133 divides an image associated with one frame input from a video image input interface by writing images of regions to be divided on division memories for which writing is enabled. Because the image input to the image division unit 133 is read in the scanning order in accordance with the raster scanning direction, it is divided into four regions using VSYNC and HSYNC in this embodiment.

Figure 11A:
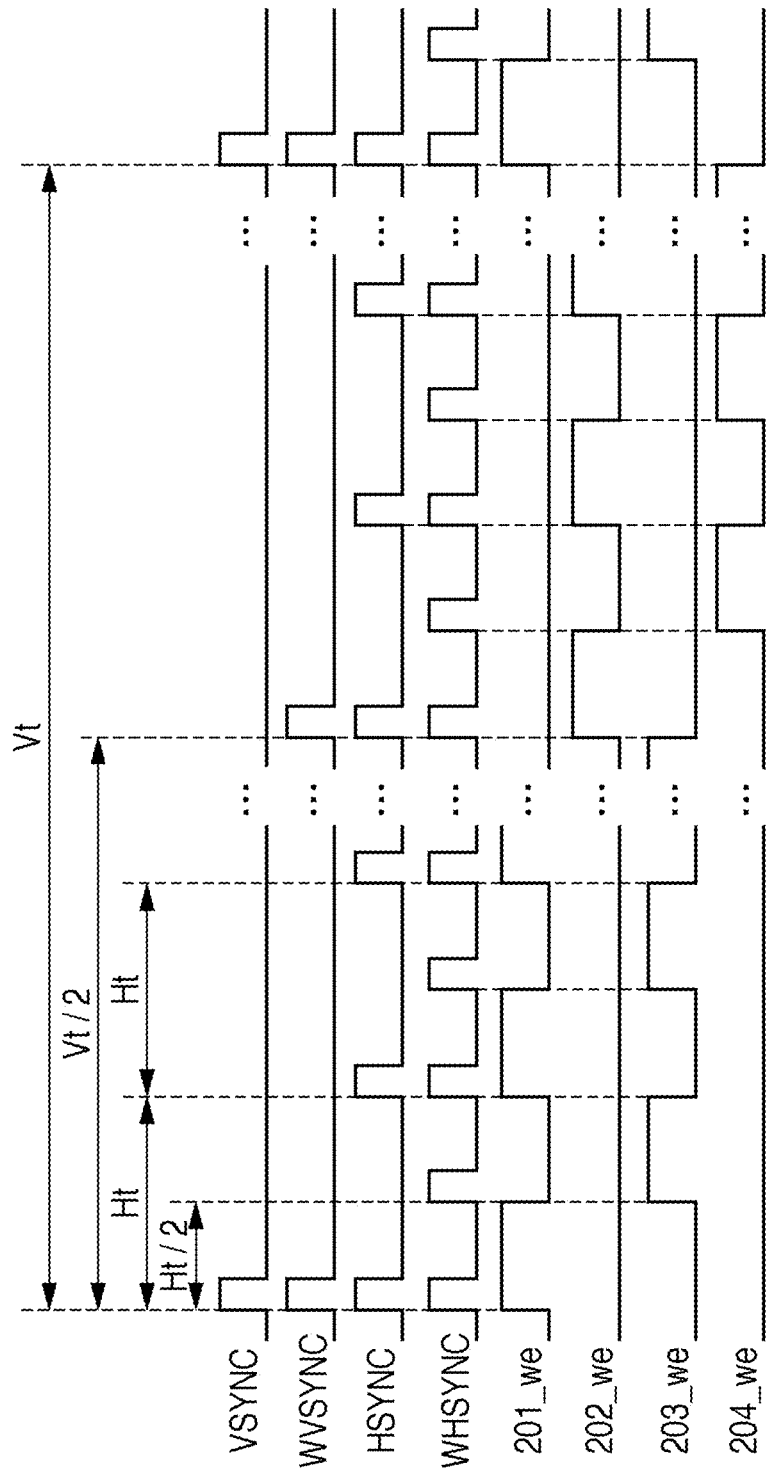
FIGS. 11A, 11B, 11C, and 11D are timing charts of processing in each block in the second embodiment.
Figure 11B:
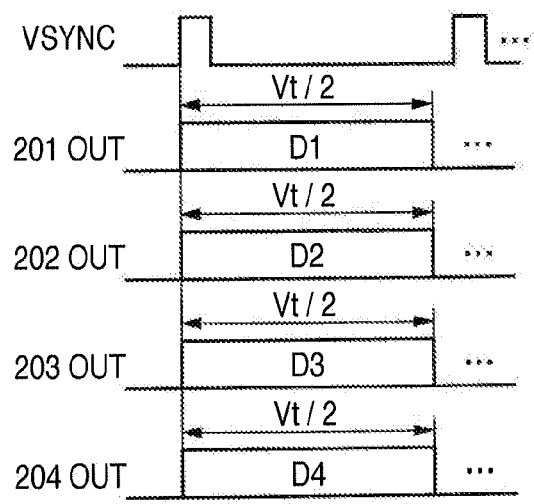

Each of a first division memory control unit 205, second division memory control unit 206, third division memory control unit 207, and fourth division memory control unit 208 generates WVSYNC which generates a pulse in a period half that of input VSYNC. Also, each division memory control unit generates WHSYNC which generates a pulse in a period half that of input HSYNC. The respective division memory control units send write enable signals for the division memories, chip select signals, and write address information in different WVSYNC and WHSYNC events, as shown in a timing chart of FIG. 11A. When, for example, the divided regions are defined as D1 to D4, as shown in FIG. 10A, and they are divided and stored in a first division memory 201 to a fourth division memory 204, respectively, the upper half regions D1 and D3 in the image are read in the first WVSYNC event. Two WHSYNC events occur upon reading the image by one line. In the first WHSYNC event, the first division memory control unit 205 sends a write enable signal so that pixels on lines of the region D1 are read into the first division memory 201. Also, in the second WHSYNC event, the third division memory control unit 207 sends a write enable signal so that pixels on lines of the region D3 are read into a third division memory 203. The lower half regions D2 and D4 in the image are read in the next WVSYNC event, and they are read in two WHSYNC events that occur upon reading by one line. That is, in the first WHSYNC event, the second division memory control unit 206 sends a write enable signal so that pixels on lines of the region D2 are read into the second division memory 202. Also, in the second WHSYNC event, the fourth division memory control unit 208 sends a write enable signal so that pixels on lines of the region D4 are read into the fourth division memory 204. In this way, image signals input in the raster scanning order are written on division memories for which writing is enabled and which are changed in accordance with WVSYNC and WHSYNC events that occur during reading, and are therefore divided into the four division memories. In the image signals which are read and divided into the respective division memories, lines Vt/2 are read out and output to image processing units in subsequent stages in accordance with the VSYNC signal, as shown in a timing chart of FIG. 11B.

(Image Combination Processing)

Image combination processing by the image combination unit 135 will be described in detail below.

Figure 10E:
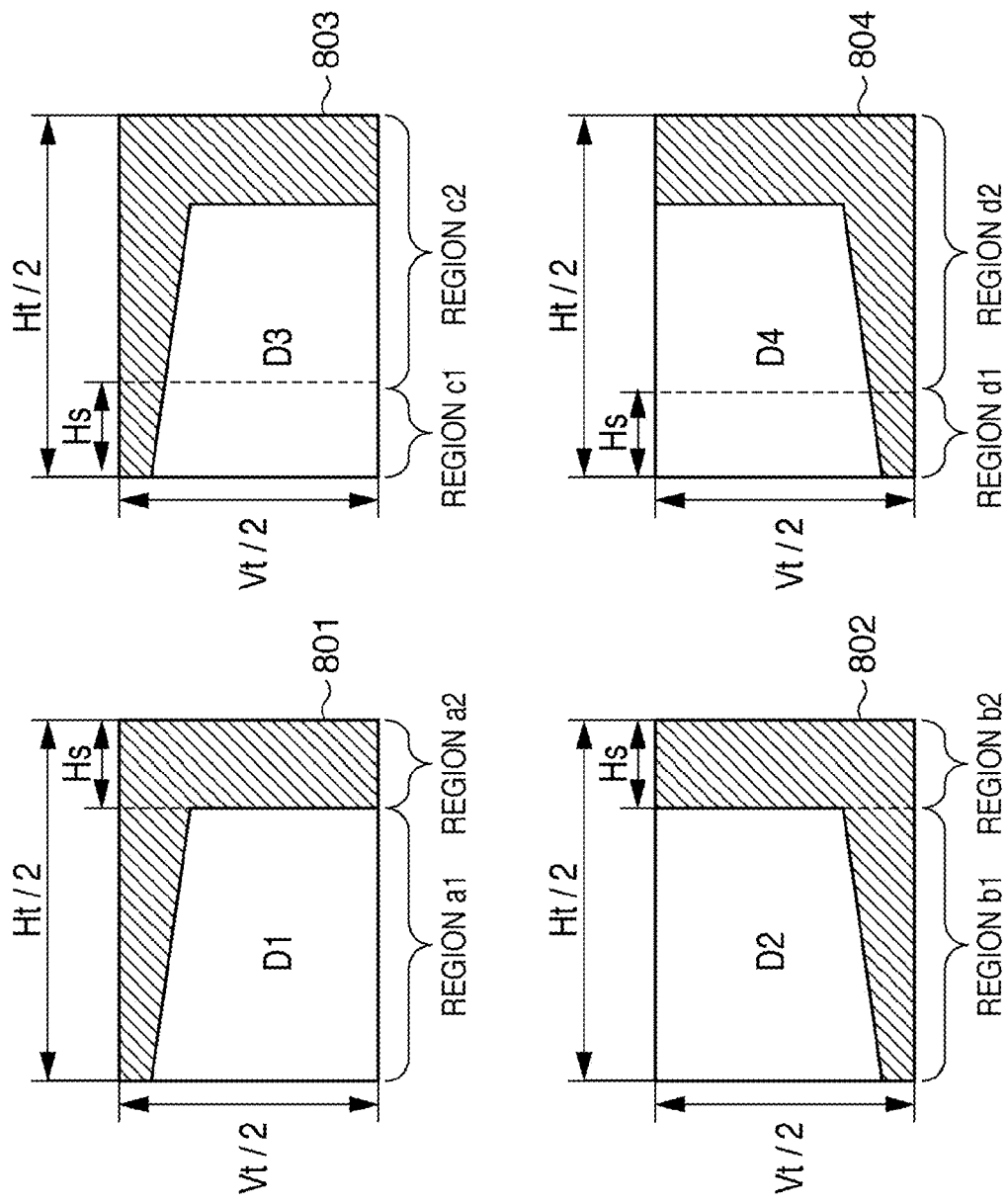

The images input to a first image processing unit 117, second image processing unit 118, third image processing unit 119, and fourth image processing unit 120 undergo various types of image processing including trapezoid distortion correction processing, and are stored in respective image processing memories. The images stored in a first image processing memory 801, second image processing memory 802, third image processing memory 803, and fourth image processing memory 804 are deformed by trapezoid distortion correction, as shown in FIG. 10E. Because the regions D1 and D3 are adjacent to each other in an image to be finally projected as one image having undergone trapezoid distortion correction processing, lines on which no image signals are present run perpendicular to the scanning direction in the second embodiment, unlike the first embodiment. More specifically, in the image which includes (Ht/2)×(Vt/2) pixels and is stored in the first image processing memory 801, a line Hs in the horizontal direction located on the right edge is a line on which no image signals are present in this embodiment. That is, images which have undergone trapezoid distortion correction processing and include lines on which no image signals are present are stored at addresses in all these image processing memories in the raster scanning order of regions.

Hence, to read out the image to be projected from each combination memory in the raster scanning order in readout from the image combination unit 135, the following processing is necessary. That is, it is necessary to move those lines on which no image signals are present to prevent lines on which image signals are present from becoming discontinuous in each combination memory. In this embodiment, the image stored in each image processing memory is divided into regions, as shown in FIG. 10E, and the corresponding image processing memory control unit controls the order in which they are read out from this image processing memory in outputting them to the image combination unit 135. The images stored in the first image processing memory 801 and second image processing memory 802 are divided into two sets of two regions: regions a2 and b2, respectively, each corresponding to the line Hs on which no image signals are present from the right edge of the image, and the remaining regions a1 and b1, respectively. The images stored in the third image processing memory 803 and fourth image processing memory 804 are divided into two sets of two regions: regions c1 and d1, respectively, each corresponding to the line Hs from the left edge of the image, and the remaining regions c2 and d2, respectively. The thus divided regions are input to selectors used to select combination memories which store the images input from the respective image processing units in the following way, thereby making it possible to transmit and store them in the respective combination memories.

Figure 11D:
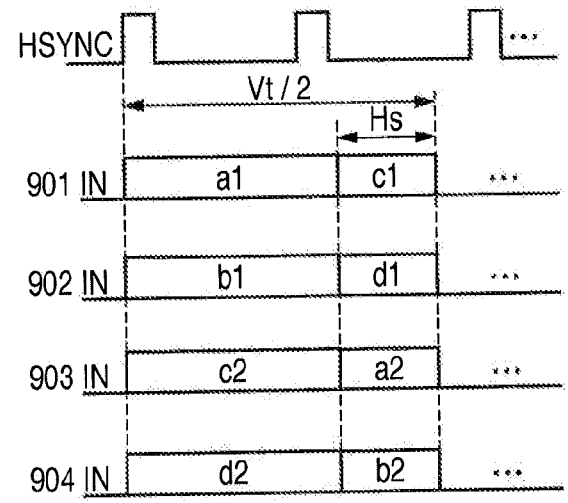
Figure 11C:
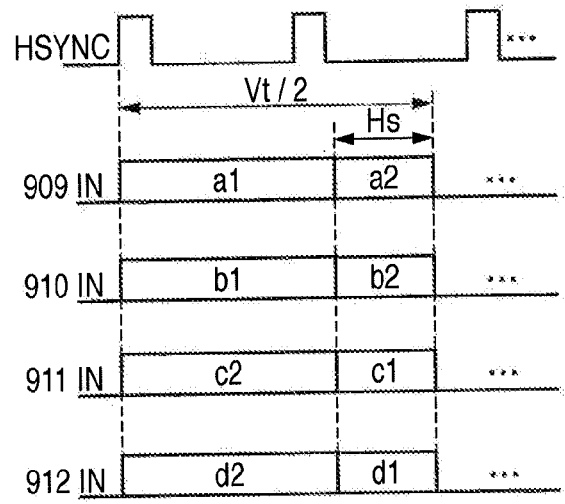

The order in which the image regions are input to each selector will be described first with reference to FIG. 11C.

A first image processing memory control unit 505 of the first image processing unit 117 inputs the images on all lines from the first image processing memory 801 to a selector 909 alternately in the order of one line of the region a1 and one line of the region a2 by the raster scanning scheme within the 2HSYNC period. A second image processing memory control unit (not shown) of the second image processing unit 118 inputs the images on all lines from the second image processing memory 802 to a selector 910 alternately in the order of one line of the region a1 and one line of the region a2 by the raster scanning scheme within the 2HSYNC period. A third image processing memory control unit (not shown) of the third image processing unit 119 inputs the images on all lines from the third image processing memory 803 to a selector 911 alternately in the order of one line of the region c2 and one line of the region c1 by the raster scanning scheme within the 2HSYNC period. A fourth image processing memory control unit (not shown) of the fourth image processing unit 120 inputs the images on all lines from the fourth image processing memory 804 to a selector 912 alternately in the order of one line of the region d2 and one line of the region d1 by the raster scanning scheme within the 2HSYNC period.

The order in which the image regions are input to each combination memory will be described next with reference to FIG. 11D.

A first combination memory 901 is selected first by the selector 909 to receive one line of the region a1 via the selector 909, and is selected next by the selector 911 to receive one line of the region c1 via the selector 911. In this manner, the image region to be input to the first combination memory 901 within the 2HSYNC period is switched from one to the other, and processing of reading an image corresponding to one line is repeated by a line Vt/2, thereby storing a continuous image without lines on which no image signals are present. That is, among images obtained by vertically dividing one image to be projected upon applying trapezoid distortion correction processing into four regions using orthogonal lines which pass through the center of the image to be projected, images located at the upper left positions are stored in the first combination memory 901 in the raster scanning order.

A second combination memory 902 is selected first by the selector 910 to receive one line of the region b1 via the selector 910, and is selected next by the selector 912 to receive one line of the region d1 via the selector 912. With this processing, among images obtained by vertically dividing one image to be projected upon applying trapezoid distortion correction processing into four regions using orthogonal lines which pass through the center of the image to be projected, images located at the lower left positions are stored in the second combination memory 902 in the raster scanning order.

A third combination memory 903 is selected first by the selector 911 to receive one line of the region c2 via the selector 911, and is selected next by the selector 909 to receive one line of the region a2 via the selector 909. In this manner, the image region to be input to the third combination memory 903 within the 2HSYNC period is switched from one to the other, and processing of reading an image corresponding to one line is repeated by a line Vt/2, thereby storing lines, on which no image signals are present, to concentrate on the left edge. That is, among images obtained by vertically dividing one image to be projected upon applying trapezoid distortion correction processing into four regions using orthogonal lines which pass through the center of the image to be projected, images located at the upper right positions are stored in the third combination memory 903 in the raster scanning order.

A fourth combination memory 904 is selected first by the selector 912 to receive one line of the region d2 via the selector 912, and is selected next by the selector 910 to receive one line of the region b2 via the selector 910. With this processing, among images obtained by vertically dividing one image to be projected upon applying trapezoid distortion correction processing into four regions using orthogonal lines which pass through the center of the image to be projected, images located at the lower right positions are stored in the fourth combination memory 904 in the raster scanning order.

In this way, one image to be projected upon applying trapezoid distortion correction processing can be divided and stored in the first combination memory 901 to the fourth combination memory 904 in the raster scanning order of regions. Also, as shown in FIG. 11D, image combination processing can be completed without delay of storage processing due to simultaneous access to each combination memory by dividing and transmitting image regions stored in each image processing memory, as described above.

Note that one image which is thus stored in each combination memory and is to be projected upon applying trapezoid distortion correction processing is read out in the following way by the corresponding combination memory control unit, thereby outputting these images to the LCD driving unit 105 in the raster scanning order.

More specifically, each combination memory control unit generates WVSYNC and WHSYNC which generate pulses in half periods from VSYNC and HSYNC, respectively, which are input together with a video signal in a video image input interface. When, for example, a control unit 101 detects a WVSYNC event in a first combination memory control unit 905, it causes the selector 913 to select the first combination memory 901 first in synchronism with the WHSYNC pulse. The first combination memory control unit 905 outputs an image of a line Ht/2 (on one horizontal line) in the first combination memory 901 to an LCD driving unit 105. Also, the control unit 101 causes the selector 913 to select the third combination memory 903 in synchronism with the next WHSYNC pulse, and a third combination memory control unit 907 outputs an image of a line Ht/2 in the third combination memory 903 to the LCD driving unit 105. In this manner, processing of alternately reading out the images for each line from the first combination memory 901 and third combination memory 903 is repeated until the next WVSYNC event is detected, thereby reading images of the upper half regions of one image, which is to be projected upon applying trapezoid distortion correction processing, in the scanning order. When the next WVSYNC event is detected as well, the images are alternately read out from the second combination memory 902 and fourth combination memory 904, thereby finally reading all lines in one image to be projected upon applying trapezoid distortion correction processing. Note that in this configuration, an operation clock used for readout from each combination memory has a rate about four times that of an operation clock used for writing on this combination memory.

Although a method of controlling readout from each combination memory, thereby outputting images to the LCD driving unit 105 in the raster scanning order has been described in this embodiment, the practice of the present invention is not limited to this. That is, even when an image is divided using a line perpendicular to the scanning direction, as in the second embodiment, the divided images can also be output to the LCD driving unit 105 in the scanning order by reading them out from the respective combination memories in a predetermined order, as in the first embodiment. More specifically, in inputting the image from each image processing unit to the image combination unit 135, the control unit 101 controls the corresponding selector so that images obtained by vertically dividing one image to be projected upon applying trapezoid distortion correction processing into four regions are stored in the respective combination memories. For example, one line of each region is read out from each of the first image processing memory 801 and third image processing memory 803 and stored in the first combination memory 901 in the order of the regions a1, c1, c2, and a2. By repeating this operation by a line Vt/4, an image located at the uppermost position among images obtained by vertically dividing one image to be projected upon applying trapezoid distortion correction processing into four regions can be stored in the first combination memory 901.

As has been described above, in projecting a projection image upon performing trapezoid distortion correction, the projection apparatus in this embodiment divides the projection image, combines the divided images having undergone trapezoid distortion correction, and projects the combined image. More specifically, the projection apparatus divides one projection image into a plurality of divided images, applies trapezoid distortion correction which uses corresponding amounts of correction to the plurality of divided images, and stores the corrected images in storage areas having an addressing structure. At this time, the addresses of the storage areas in which the images are stored are determined such that when the images are read out in the same order of address as that in which they are read out in projection without trapezoid distortion correction, they are read out in the scanning order used in projecting one image having undergone trapezoid distortion correction, regardless of the amount of correction.

Also, in trapezoid distortion correction in the same direction as the scanning direction, the projection apparatus classifies the divided images having undergone trapezoid distortion correction into lines on which image signals in a direction perpendicular to the scanning direction are present and lines on which no image signals are present. The projection apparatus controls the addresses at which the images having undergone trapezoid distortion correction to prevent the lines on which image signals are present from becoming discontinuous.

Thus, because the projection apparatus applies trapezoid distortion correction processing to the divided images in a plurality of image processing circuits, it is possible to shorten the time taken for trapezoid distortion correction processing, and therefore to project a multi-pixel image without slowing down the rendering frame rate. Also, because the projection apparatus performs arithmetic processing in parallel using a plurality of image processing circuits, there is no need to perform processing for reducing the amount of arithmetic operation, such as a decrease in amount of color information, thus making it possible to reduce image degradation. Moreover, because the addresses of the storage areas in which a plurality of images having undergone trapezoid distortion correction are stored are controlled to be able to read out and project the images in the scanning order, it is possible to facilitate readout of images associated with projection, like the conventional scheme in which an image is projected upon performing trapezoid distortion correction without division.

Third Embodiment

A method in which, after each image processing unit applies trapezoid distortion correction processing to divided images, these images are classified and stored in a plurality of combination memories by the image combination unit 135 has been described in the first and second embodiment. In the third embodiment, an image combination unit 135 includes only a single combination memory and a single combination memory control unit. Note that in this embodiment, a liquid crystal projector 100 has the same configuration as in the first and second embodiments except for the image combination unit 135, and a description of the functional configuration of each block will not be given.

FIG. 12 is a block diagram showing the functional configuration of the image combination unit 135 in this embodiment.

The image combination unit 135 includes a single combination memory 1201, a single combination memory control unit 1202, and a selector 1203. When only a single combination memory is used, images cannot be input to the image combination unit 135 in parallel, as described above. In this case, therefore, images sequentially input from the respective image processing units, as shown in FIG. 13, are stored in a specific order of address in the combination memory 1201. Image combination processing in this embodiment will be described below with reference to the accompanying drawings. Although an image to be projected is vertically divided into four regions by an image division unit 133 and the divided images are input to the respective image processing unit in this embodiment, as in the first embodiment, the image division method is not limited to this.

(Image Combination Processing)

When the images which are output from the respective image processing units to the combination memory 1201 of the image combination unit 135 and stored in the combination memory 1201 are read out in a specific order of address in the combination memory 1201, lines on which no image signals are present are included in these images halfway. That is, lines on which no signals are present generate discontinuity, so the combination memory control unit 1202 must control image readout so that the images are read out in the raster scanning order in outputting them to an LCD driving unit 105.

Figure 14:
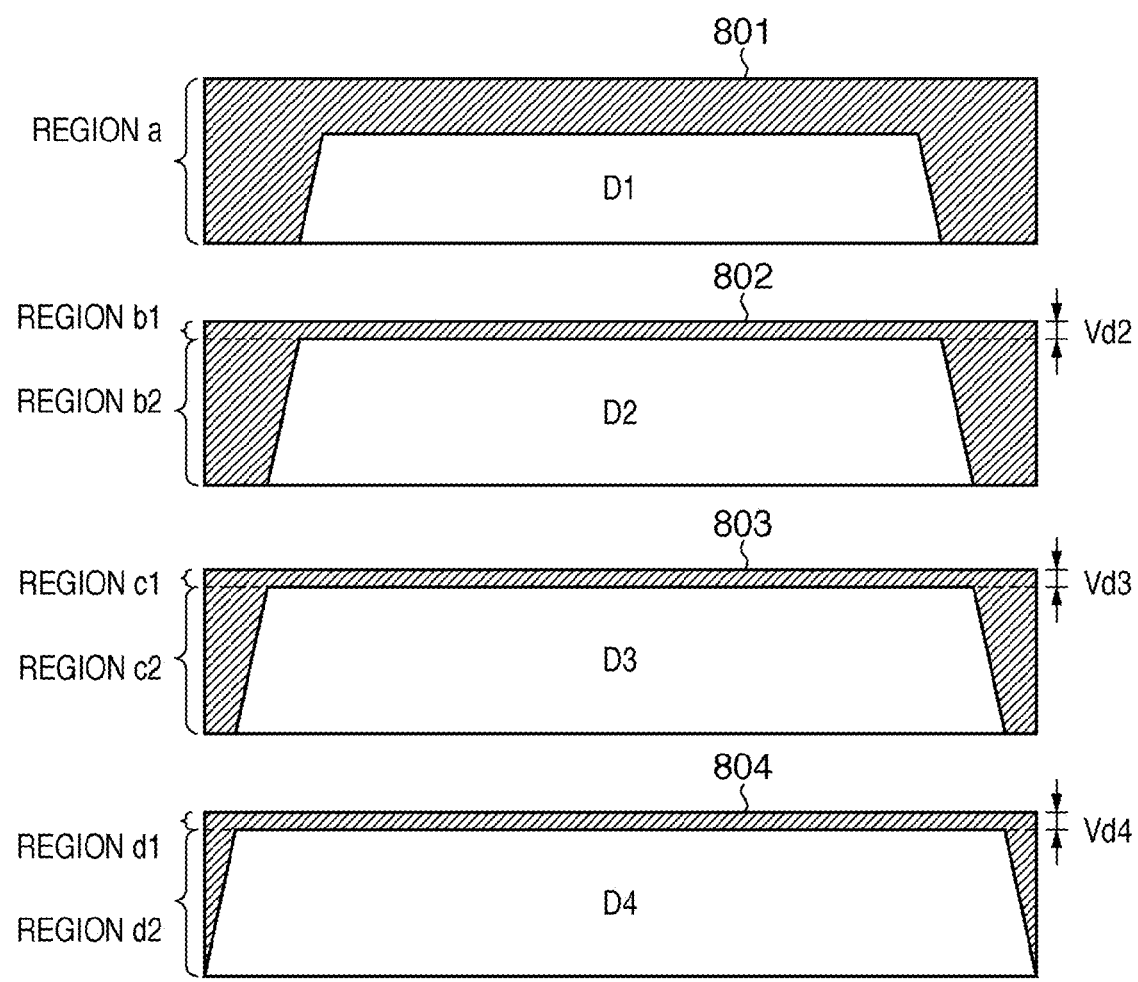
FIG. 14 is a view for explaining classified image regions according to the third embodiment.

FIG. 14 shows images which have undergone trapezoid distortion correction processing by the respective image processing units and are stored in a first image processing memory 801 to a fourth image processing memory 804. In this embodiment, the image stored in each image processing memory is divided into two regions: a line on which no image signals are present, and a line on which image signals are present, and a control unit 101, for example, stores the region information in a RAM (not shown). For example, the image stored in the second image processing memory 802 is divided into a region b1 corresponding to a line Vd2 on which no image signals are present, and the remaining region b2. Note that because a line on which image signals are present in the image stored in the first image processing memory 801 continues to a line on which no image signals are present even in final projection onto a screen, this image is not divided in accordance with the presence/absence of image signals and is defined as a single region a in this embodiment.

The combination memory control unit 1202 controls readout of the images using the information of the above-mentioned divided regions in outputting them from the combination memory 1201 of the image combination unit 135 to the LCD driving unit 105. More specifically, the combination memory control unit 1202 reads out and outputs the images from the combination memory 1201 to the LCD driving unit 105 in the raster scanning order of one image to be projected upon applying trapezoid distortion correction processing.

FIG. 15A is a timing chart showing the order in which the combination memory control unit 1202 reads out, from the combination memory 1201, the images of the regions to be output to the LCD driving unit 105. The combination memory control unit 1202 obtains the information of the divided regions from the control unit 101, and reads out and outputs the regions of lines on which no image signals are present to the LCD driving unit 105 in the raster scanning order first (the regions b1, c1 and d1). The combination memory control unit 1202 reads out and outputs the regions of lines on which image signals are present to the LCD driving unit 105 in the raster scanning order next (the regions a, b2, c2 and d2). The combination memory control unit 1202 performs this readout processing within the VSYNC period. In this manner, in reading out and outputting the images from the combination memory 1201 of the image combination unit 135, these images can be read out in the raster scanning order of an image to be projected upon applying trapezoid distortion correction. Also, by reading out those images in the raster scanning order of an image to be projected upon applying trapezoid distortion correction processing, the LCD driving unit 105 can control an LCD unit 104 upon sequentially processing the input images without storing them in a buffer, so it is possible to reduce the time taken for processing.

Although a method in which the combination memory control unit 1202 reads out the images from the combination memory 1201 in the raster scanning order in outputting them from the image combination unit 135 to the LCD driving unit 105 has been described in this embodiment, the practice of the present invention is not limited to this. When, for example, the image combination unit 135 includes a single combination memory, the images input from the respective image processing units may be stored from the respective image processing units into the combination memory 1201 in the raster scanning order of one image to be projected upon applying trapezoid distortion correction processing. That is, the image output from the image processing memory of each image processing unit may be stored in the combination memory 1201 by controlling the order and timing with which regions are output from each image processing memory, as shown in FIG. 15B. With this processing, the combination memory control unit 1202 can output images to be projected to the LCD driving unit 105 in the raster scanning order by reading them out in a specific order of address in the combination memory 1201.

As has been described above, in projecting a projection image upon performing trapezoid distortion correction, the projection apparatus in this embodiment divides the projection image, combines the divided images having undergone trapezoid distortion correction, and projects the combined image. More specifically, the projection apparatus divides one projection image into a plurality of divided images, applies trapezoid distortion correction which uses corresponding amounts of correction to the plurality of divided images, and stores the corrected images in storage areas having an addressing structure. In projecting the plurality of images stored in the storage areas as one image having undergone trapezoid distortion correction, the projection apparatus controls the addresses at which the images are read out from the storage areas so that the images are read out in the scanning order of the image having undergone trapezoid distortion correction.

Thus, because the projection apparatus applies trapezoid distortion correction processing to the divided images in a plurality of image processing circuits, it is possible to shorten the time taken for trapezoid distortion correction processing, and therefore to project a multi-pixel image without slowing down the rendering frame rate. Also, because the projection apparatus performs arithmetic processing in parallel using a plurality of image processing circuits, there is no need to perform processing for reducing the amount of arithmetic operation, such as a decrease in amount of color information, thus making it possible to reduce image degradation. Moreover, by controlling the addresses of the storage areas, at which the images are read out, in projecting one image having undergone trapezoid distortion correction, the images can be read out and projected in the scanning order.

Although the information of lines on which no image signals are present is also transmitted in outputting an image from each image processing unit to the image combination unit 135 in the three above-mentioned embodiments, the practice of the present invention is not limited to this. That is, only the information of lines on which image signals are present may be output from each image processing unit to the image combination unit 135. In this case, the image combination unit 135 can store input images from addresses in the combination memory, which have offsets by lines on which no image signals are present. When, for example, the region of a line on which no image signals are present and the region of a line on which image signals are present are divided, as shown in FIG. 14, in each image processing memory as a result of applying trapezoid distortion correction processing by each image processing unit, the following processing needs only be done. FIG. 16 is a timing chart showing regions input from each image processing unit to the image combination unit 135, and the timings of this operation when the regions are divided, as shown in FIG. 14. In this manner, only the regions a, b2, c2, and d2 in which image signals are present are output from each image processing unit to the image combination unit 135 without outputting a region in which no image signals are present, thereby making it possible to further reduce the time taken for processing.

In outputting only the regions of lines on which image signals are present from each image processing unit to the image combination unit 135, if the amount of trapezoid distortion correction changes upon, for example, movement of the installation position of the liquid crystal projector 100, the following processing need only be done. As the installation position of the liquid crystal projector 100 changes, the amount of trapezoid distortion correction also changes, and the shape of an image to be projected, in turn, changes. At this time, in the LCD unit 104, a pixel which has received an image signal before movement of the liquid crystal projector 100 often receives no image signal after the movement, so the image of the previous frame may remain in the memory and be projected. In such a case, if, for example, movement of the liquid crystal projector 100 has been detected or the amount of trapezoid distortion correction has changed, information of lines on which no image signals are present need only be output together to the image combination unit 135 for at least one frame. That is, by updating information indicating that no image signal is present for the address of a pixel which does not receive an image signal after movement of the liquid crystal projector 100, it is possible to prevent the image of the previous frame from remaining in the memory and being projected. Note that when the number of lines on which no image signals are present decreases resulting from a change in amount of trapezoid distortion correction, the information of lines on which no image signals are present need not always be output to the image combination unit 135.

Although an image input from a single input interface is divided by the image division unit 133 and trapezoid distortion correction processing is applied to the divided images in the examples of the above-mentioned embodiments, already divided images may be input from a plurality of input interfaces. In this case, the input images are directly transmitted to the respective image processing units without using the image division unit 133, and undergo correction processing such as trapezoid distortion correction.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-114705, filed May 18, 2010, which is hereby incorporated by reference herein in its entirety.

What is claimed is:

1. A projection apparatus which projects an image onto a projection plane based on an input image signal, the apparatus comprising:
   a decision unit configured to decide a shape of the image to be projected onto the projection plane;
   a deformation unit configured to deform shapes of divided images corresponding to the input image signal based on the shape of the image decided by said decision unit;
   a combination unit configured to combine the images deformed by said deformation unit such that each of the images is disposed on corresponding coordinates of the shape of the image decided by said decision unit; and
   a projection optical system configured to project the image combined by said combination unit onto the projection plane.

2. The apparatus according to claim 1, further comprising a division unit configured to divide an image represented by the input image signal into a plurality of regions, and temporarily store the divided images in a plurality of independent storage areas, wherein said deformation unit separately deforms the images stored in the plurality of storage areas, respectively.

3. The apparatus according to claim 1, wherein said combination unit combines the plurality of deformed images with each other such that no image which is not based on the input image signal is included between the plurality of deformed images.

4. The apparatus according to claim 1, wherein said combination unit reads image signals representing the plurality of deformed images in an order corresponding to a scanning direction of the image projected by said projection optical system.

5. The apparatus according to claim 1, wherein said combination unit includes a storage unit having an addressing structure, said combination unit stores the plurality of images deformed by said deformation unit in said storage unit, and said projection optical system reads out the images stored in said storage unit in a specific order of address, and projects the images onto the projection plane.

6. The apparatus according to claim 5, wherein said combination unit changes a recording address indicating a location, in which the image deformed by said deformation unit is stored in said storage unit, in accordance with the shape of the image decided by said decision unit.

7. The apparatus according to claim 6, wherein the deformation state formed by said deformation unit is determined in accordance with a projection angle of the projection apparatus.

8. The apparatus according to claim 6, wherein the deformation state formed by said deformation unit is determined in accordance with a shape of the projection plane.

9. A projection method comprising the steps of:
deciding a shape of an image to be projected onto the projection plane;
deforming shapes of divided images corresponding to an input image signal based on the shape of the image decided in the deciding step;
combining the images deformed in the deforming step such that each of the images is disposed on corresponding coordinates of the shape of the image decided in the deciding step; and
projecting the image combined in the combining step onto the projection plane.

10. The method according to claim 9, further comprising a dividing step of dividing an image represented by the input image signal into a plurality of regions, and temporarily storing the divided images in a plurality of independent storage areas, wherein in the deforming step, the images stored in the plurality of storage areas, respectively, are separately deformed.

11. The method according to claim 9, wherein in the combining step, the plurality of deformed images are combined with each other such that no image which is not based on the input image signal is included between the plurality of deformed images.

12. The method according to claim 9, wherein in the combining step, image signals representing the plurality of deformed images are read in an order corresponding to a scanning direction of the image projected in the projecting step.

13. The method according to claim 9, wherein in the combining step, the plurality of images deformed in the deforming step are stored in a memory having an addressing structure, and in the projecting step, the images stored in the memory are read out in a specific order of address, and projected onto the projection plane.

14. The method according to claim 13, wherein in the combining step, a recording address indicating a location, in which the image deformed in the deforming step is stored in the memory, is changed in accordance with the shape of the image decided in the decision step.

* * * * *